US006603607B2

(12) United States Patent
Matsui et al.

(10) Patent No.: US 6,603,607 B2
(45) Date of Patent: Aug. 5, 2003

(54) MINUTE PARTICLE OPTICAL MANIPULATION METHOD AND APPARATUS

(75) Inventors: Kumiko Matsui, Yokohama (JP); Hisashi Okugawa, Yokosuka (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/117,182

(22) Filed: Apr. 8, 2002

(65) Prior Publication Data

US 2002/0109923 A1 Aug. 15, 2002

Related U.S. Application Data

(63) Continuation-in-part of application No. 09/826,104, filed on Apr. 5, 2001, now abandoned.

(30) Foreign Application Priority Data

Apr. 7, 2000 (JP) ....................................... 2000-105968
Apr. 9, 2001 (JP) ....................................... 2001-109394

(51) Int. Cl.[7] ................................................ G02B 11/00
(52) U.S. Cl. ...................................................... 359/642
(58) Field of Search ......................................... 359/642

(56) References Cited

U.S. PATENT DOCUMENTS 4,893,886 A 1/1990 Ashkin et al.
6,376,842 B1 * 4/2002 Yamada ...................... 250/398

OTHER PUBLICATIONS

Patent Abstracts of Japan, "Method and Device For Laser Trapping", Apr. 16, 1993.

* cited by examiner

*Primary Examiner*—Scott J. Sugarman

(57) ABSTRACT

A minute particle optical manipulation method and a minute particle optical manipulation apparatus are capable of simply strengthening a trapping force in an optical-axis direction and expanding a range where the trapping for acts in the optical-axis direction without requiring an optical element such as a special prism etc., and obtaining the trapping force enough to trap the particle even when the minute particle exists deep within a medium while keeping the trapping force when the minute particle is in a shallow position within the medium.

11 Claims, 16 Drawing Sheets

MINUTE PARTICLE OPTICAL MANIPULATION METHOD AND APPARATUS

This application is a Continuation-In-Part application of U.S. Patent application Ser. No. 09/826,104, filed Apr. 5, 2001 now abandon.

This application claims the benefit of Japanese Applications No. 2000-105968 and No. 2001-109394, which are hereby incorporated by reference.

BACKGROUND OF THE INVENTION

1. Field of the Invention

The present invention relates generally to a minute particle optical manipulation method and a minute particle optical manipulation apparatus, and more particularly to a minute particle optical manipulation method and a minute particle optical manipulation apparatus for three-dimensionally trapping and moving a minute particle by irradiating the minute particle with beams.

2. Related Background Art

A technology of optically manipulating a minute particle is generally known as optical tweezers and optical trapping. This technology involves the use of mainly a laser and is therefore called laser trapping and laser tweezers.

This technology is that laser beam emitted from a radiation source is converged in a conical shape by a converging optical system and falls upon the vicinity of the minute particle existing in the medium, and the minute particle is trapped or held and moved by making use of a radiation pressure occurred about the minute particle. This technology is utilized in diversity as a method of trapping and manipulating a cell of a living body and a microbe in a non-contact and non-destructive manner.

An explanation of how the minute particle is manipulated by the optical tweezers described above will be made referring to FIGS. 11 and 12. Herein, FIG. 11 is a view schematically showing a configuration of the prior art optical tweezers. FIG. 12 is a partially enlarged view of FIG. 11 and explanatorily shows how a minute particle S is manipulated by the optical tweezers.

As illustrated in FIG. 11, a parallel beam L11 for the optical tweezers, which is emitted from a light source LS1 for the optical tweezers, is reflected in a wavelength-selective manner by a dichroic mirror DM and enters a normal converging optical system O3 of which a spherical aberration is substantially zero. Then, the vicinity of the minute particle S in a medium B held by a holder H such as a Petri dish and a slide glass, is irradiated with a cone-shaped converged beam L13 with no spherical aberration, which has passed through the converging optical system O3.

Note that mainly a laser is herein used as the optical tweezers oriented light source LS1, and an objective lens for a transmission type optical microscope (that is hereinafter simply called a "microscope objective lens") is often used in terms of utilization as the converging optical system O3.

Thus, as shown in FIG. 12, if the minute particle S exists in the vicinity of a converging point P at which the beam is converged in the conical shape by the converging optical system O3, this cone-shaped converged beam L13 is reflected by the surface of the minute particle S and refracted inside the minute particle S, thus deflecting its traveling direction. As a result, a beam momentum changes. At this time, a radiation pressure corresponding to a change in the momentum of the converged beam L13 occurs about the minute particle S, and there acts a force F as indicated by a bold solid line in FIG. 12.

Now, supposing that the minute particle S has a refractive index higher than that of the medium B surrounding the particle S and is classified as a non-absorptive spherical minute particle, it is known from an analysis of the change in the momentum of the converged beam that the radiation pressure acts toward a higher light intensity, and the force F acts to get the minute particle F attracted to the converging point P. Accordingly, it is feasible to trap and manipulate the minute particle S by making use of this force F.

Further, when thus trapping and manipulating the minute particle S in the medium B, it is necessary to observe how the particle is trapped and manipulated, and therefore an observation optical system is provided.

Namely, illumination beam L2 emitted from an observation light source LS2 provided under the holder H travels through an illumination optical system C1 and illuminates over the vicinity of the minute particle S in the medium B. Thereafter, the illumination beam L2 passes through the converging optical system O3, then penetrates a dichroic mirror DM and is projected on an image surface IMG to form an image thereon.

Then, an enlarged image of the minute particle S that is formed on this image surface IMG is viewed by a naked eye E through an imaging device D such as a CCD camera etc. as well as through an eyepiece EP, thereby making it possible to observe how the minute particle S in the medium B is trapped and manipulated.

In the conventional optical tweezers, however, it is known that a force for trapping the minute particle S in an axial direction, i.e., an optical-axis direction (which will hereinafter referred to as a "trapping force") along a traveling direction of the optical tweezers oriented converged beam L13, is by far smaller than a trapping force acting in a direction perpendicular to the optical-axis direction.

It is generally known that beam containing a component having a larger angle to the optical axis, i.e., a high NA (Numerical Aperture) component, is useful for obtaining a strong trapping force in the optical tweezers. In fact, however, it is difficult in terms of optics to actualize the converged beam having a numerical aperture of 1.5 or larger (NA=1.5 or above). Further, there is also a method of strengthening the light intensity with which the minute particle is irradiated, however, if a large output light source is used, there might be a possibility in which a minute living sample is damaged or destructed.

Therefore, what is desired is a method of enhancing the trapping force in the optical-axis direction without strengthening the intensity of the beam irradiation upon the minute particle, and as a matter of fact some proposals have been made so far.

"Laser Trapping Method and Apparatus" (Japanese Patent No. 2947971) and "Laser Trapping Apparatus and Prism Used thereof" (Japanese Patent Application Laid-Open No. 8-262328), may be given by examples thereof.

The laser trapping related to each of those proposals utilizes such a principle that the high NA component, having the large angle to the optical axis, of the converged beam makes a great contribution to the trapping force, while the component having a small angle does not contribute to the trapping force so much. The laser trapping is based on such a structure that a prism taking a special shape is inserted into the light path, parallel light beam from the light source is thereby converted into a converged beam taking a conical cylindrical shape that is composed of only a large angle component without any loss, and the sample is irradiated with the converged beam.

The laser trapping related to each of those proposals, however, involves inserting the specially-shaped prism into the light path in order to convert the beam into the conical cylindrical shape. Further, it is required that the beam substantially symmetric about the optical axis be obtained for stably trapping the sample, and hence there is a demand for a highly precise adjustment of a position of the prism.

As a result, each of the laser trapping apparatuses related to the proposals given above involves the use of an expensive prism element and therefore costs high. Another problem is that this laser trapping apparatus needs a mechanism for accurately holding the prism, which leads a scale-up of the apparatus.

Moreover, the trapping force in the optical-axis direction is enhanced because of using the conical cylindrical converged beam, however, a range where the trapping force acts in the optical-axis direction shrinks, resulting in a problem that only the sample in close proximity to the converging point can be trapped.

Accordingly, it is a target to actualize the optical tweezers capable of enhancing the trapping force in the optical-axis direction and expanding the range where the trapping force acts in the optical-axis direction without requiring an optical element such as a special prism etc.

Further, generally the optical tweezers have a comparatively weak trapping force in the optical-axis direction, and besides the range where the trapping force acts in the optical-axis direction is limited. Hence, in the case of trapping and manipulating the minute particle existing in a deep position in the medium, there exists a necessity of making an adjusting for getting tips of the optical tweezers, i.e., the converging point of the beam close to the vicinity of the minute particle, namely making a focusing adjustment.

In fact, however, there arises a problem in which even when making the focusing adjustment, the maximum trapping force obtained by the optical tweezers decreases as the position of the minute particle in the medium gets deeper, resulting in a difficulty of trapping the minute particle.

This is because a distance at which the beam travels through the medium surrounding the minute particle becomes longer as the position of the minute particle in the medium gets deeper, with the result that a minus spherical aberration occurs in the converged beam.

For instance, if the minute particle in the medium composed of a liquid such as water is trapped through a cover glass, an objective lens for observing a living body, which is often used as a converging optical system for the conventional optical tweezers, is adjusted so that the spherical aberration is zero at the under surface of the cover glass. If the beam is converged at a position deep within the medium under the cover glass, the minus spherical aberration occurs when passing through the medium. Therefore, the maximum trapping force obtained by the optical tweezers becomes weaker as the position of the minute particle in the medium gets deeper, and it is difficult to trap the minute particle. Further, the same situation also occurs in the case of trapping a molecule existing not in proximity to the surface of a thick living sample but in a position deep inside.

Accordingly, it has been a target to actualize the optical tweezers capable of obtaining the trapping force enough to trap the particle even when the minute particle exists deep within the medium.

SUMMARY OF THE INVENTION

It is a primary object of the present invention, which was devised to obviate the problems inherent in the prior art, to provide a minute particle optical manipulation method and a minute particle optical manipulation apparatus that are capable of simply strengthening a trapping force in an optical-axis direction and expanding a range where the trapping for acts in the optical-axis direction without requiring an optical element such as a special prism etc., and obtaining the trapping force enough to trap the particle even when the minute particle exists deep within a medium while keeping the trapping force when the minute particle is in a shallow position within the medium.

To accomplish the above object, the present inventor discovered that after calculating the trapping force in the optical-axis direction in each case of changing in many ways a condition of beam with which the minute particle in the medium is irradiated, the trapping force in the optical-axis direction is strengthened if a plus spherical aberration is intentionally given to a cone-shaped converged beam with which the minute particle in the medium is irradiated.

Then, as a result of having made examinations over and over in concentration on the basis of the above knowledge, it was confirmed that when irradiating the minute particle in the medium with the cone-shaped converged beam having the plus spherical aberration, the range where the trapping force acts in the optical-axis direction is expanded as well as strengthening the trapping force in the optical-axis direction, and a sufficiently strong trapping force is obtained even when the minute particle exists deep inside the medium.

Accordingly, the above object is accomplished by a minute particle optical manipulation method and a minute particle optical manipulation apparatus according to the present invention.

According to a first aspect of the present invention, a minute particle optical manipulation method comprises a step of irradiating a minute particle in a medium with a cone-shaped converged beam having a plus spherical aberration, and a step of trapping and manipulating the minute particle.

In the minute particle optical manipulation method according to the first aspect, the trapping force in the optical-axis direction is more strengthened and the range where the trapping force acts in the optical-axis direction is more expanded by irradiating the minute particle in the medium with the cone-shaped converged beam having the plus spherical aberration and trapping and manipulating the minute particle without making a high-level adjustment such as inserting a special prism than in a case of converging a cone-shaped converged beam having no aberration at one point.

Further, if the minute particle exists deep inside the medium under the cover glass, a minus spherical aberration occurs when the converged beam travels through the medium in the prior art. The minus spherical aberration occurred depending on a depth in the medium can be intentionally, however, canceled and converted into a plus spherical aberration by use of the cone-shaped converged beam having the plus spherical aberration. It is therefore feasible to obtain the sufficiently strong trapping force while keeping the trapping force when the minute particle exists shallow in the medium.

Note that a method of giving the plus spherical aberration to the cone-shaped converged beam with which the minute particle in the medium is irradiated involves the use of a converging optical system designed and manufactured so that the optical system itself has the plus spherical aberration. Other than this method, there are a variety of methods capable of simply generating the plus spherical aberration even when using the converging optical system having almost no occurrence of the spherical aberration as exemplified by an existing objective lens of a microscope.

For example, in the converging optical system that causes almost no spherical aberration, there are methods such as putting a transparent thin plane-parallel plate in a position where the beam on the light path diverge or converge and diverging or converging the beam, disposing a diffraction optical element for generating the spherical aberration on the light path, a method of changing an arranging interval (air spacing) by moving in the optical-axis direction some lenses of a lens unit constituting the converging optical system, replacing, when using a cover glass, this cover glass with one exhibiting a high refractive index, and exchanging, when using an oil-immersed objective lens, this oil with one having a high refractive index.

According to a second aspect of the present invention, a minute particle optical manipulation method according to the first aspect may further comprise a step of arbitrarily changing the plus spherical aberration of the cone-shaped converged beam in accordance with a condition of the minute particle in the medium.

In the minute particle optical manipulation method according to the second aspect, the plus spherical aberration of the cone-shaped converged beam with which the minute particle is irradiated is arbitrarily changed, whereby the optimum plus spherical aberration can be selected if the conditions of the target minute particle itself, e.g., a size and a material of the minute particle are different, and if the conditions under which the minute particle exists, e.g., a material of the medium and a depth in which the minute particle exists in the medium are different. Hence, the minute particle optical manipulation method according the first aspect yields effects wherein the trapping force in the optical-axis direction is strengthened, the range in which the trapping force acts in the optical-axis direction is expanded, and the sufficiently strong trapping force is obtained in the deep position in the medium while keeping the trapping force when the minute particle exists in a shallow position in the medium.

Note that the method of arbitrarily changing the plus spherical aberration of the cone-shaped converged beam with which the minute particle in the medium is irradiated may be, if exemplified corresponding to the method of giving the plus spherical aberration in the minute particle optical manipulation method according to the first aspect, for instance, a method of preparing plural types of transparent thin plane-parallel plates for diverging or converging the beam and diffraction optical elements for generating the spherical aberration, selecting those exhibiting desired characteristics and inserting or removing them in predetermined positions on the light path of the converging optical system with almost no occurrence of the spherical aberration, a method of changing the arranging interval (air spacing) by further moving in the optical-axis direction some lenses of the lens unit constituting the converging optical system, replacing, when using the cover glass, this cover glass with other cover glass exhibiting a different refractive index, and exchanging, when using the oil-immersed objective lens, this oil with other oil having a different refractive index.

In a minute particle optical manipulation method according to the first or second aspect, it is preferable that there be established a relationship such as:

$$n1>n2$$

where n1 is a refractive index of the minute particle, and n2 is a refractive index of the medium, and a spherical aberration SA with respect to a maximum NA component of the cone-shaped converged beam has the following relationship:

$$0.2\ R \leqq SA \leqq 1.5\ R$$

where R is a radius of the minute particle.

Then, more essentially, it is desirable in order to obtain the trapping force most effectively especially when the minute particle exists in a comparatively shallow position in the medium that the spherical aberration SA with respect to the maximum NA component of the cone-shaped converged beam has the following relationship:

$$0.2\ R \leqq SA \leqq 1.0\ R$$

Still further, it is more desirable in order to obtain the trapping force most effectively particularly when the minute particle exists in a comparatively deep position in the medium that the spherical aberration SA with respect to the maximum NA component of the cone-shaped converged beam has the following relationship:

$$0.75\ R \leqq SA \leqq 1.5\ R$$

According to a third aspect of the present invention, a minute particle optical manipulation apparatus comprises a converging optical system for generating a cone-shaped converged beam having a plus spherical aberration, wherein a minute particle in a medium is irradiated with the cone-shaped converged beam having the plus spherical aberration that emerges from the converging optical system, and is trapped and manipulated.

Thus, the minute particle optical manipulation apparatus according to the third aspect has the converging optical system for generating the cone-shaped converged beam having the plus spherical aberration. It is therefore possible to easily carry out the minute particle optical manipulation method according to the first aspect that includes the steps of irradiating the minute particle in the medium with the cone-shaped converged beam having the plus spherical aberration and trapping and manipulating the minute particle. Hence, there are exhibited the effects of the minute particle optical manipulation method according to the first aspect such as strengthening the trapping force in the optical-axis direction, expanding the range in which the trapping force acts in the optical-axis direction, and obtaining the sufficiently strong trapping force in the deep position in the medium while keeping the trapping force when the minute particle exists in a shallow position in the medium.

Note that the converging optical system for generating the cone-shaped converged beam having the plus spherical aberration may be herein a converging optical system designed and manufactured to have the plus spherical aberration from the beginning. Other than this optical system, however, there are a variety of converging optical systems each capable of easily generating the plus spherical aberration even if using the converging optical system with almost no occurrence of the spherical aberration as in the case of an existing microscope objective lens.

For instance, some of the converging optical systems with almost no occurrence of the spherical aberration have such a geometry that the transparent thin plane-parallel plate is disposed in the position for diverging or converging the beam on the light path, that the diffraction optical element for generating the spherical aberration is disposed on the light path, and that some lenses of the lens unit constituting the converging optical system are moved in the optical-axis direction to change the arranging interval (air spacing).

According to a fourth aspect of the present invention, a minute particle optical manipulation apparatus according to the third aspect may further comprise a spherical aberration changing device for arbitrarily changing the plus spherical aberration of the cone-shaped converged beam which is generated by the converging optical system in accordance with a condition of the minute particle in the medium.

Thus, the minute particle optical manipulation apparatus according to the fourth aspect includes the spherical aberration changing device for arbitrarily changing the plus spherical aberration of the cone-shaped converged beam generated by the converging optical system. It is therefore feasible to easily carry out the minute particle optical manipulation method according to the second aspect that includes the step of arbitrarily changing the plus spherical aberration of the cone-shaped converged beam in accordance with the condition of the minute particle in the medium. Hence, there exhibited the effects of the minute particle optical manipulation method according to the second aspect such as strengthening the trapping force in the optical-axis direction, expanding the range in which the trapping force acts in the optical-axis direction, and obtaining the sufficiently strong trapping force in the deep position in the medium while keeping the trapping force when the minute particle exists in a shallow position in the medium, corresponding to changes in the variety of conditions of the minute particle in the medium.

Note that as the spherical aberration changing device for arbitrarily changing the plus spherical aberration of the cone-shaped converged beam with which the minute particle in the medium is irradiated, if corresponding to the element for giving the plus spherical aberration as exemplified in the minute particle optical manipulation apparatus according to the third aspect, it may be considered to provide an inserting/removing mechanism wherein plural types of, e.g., transparent thin plane-parallel plates for diverging or converging the beam and diffraction optical elements for generating the spherical aberration are prepared, the plane-parallel plate and the diffraction optical element exhibiting desired characteristics are selected from those plates and elements and inserted in or removed from predetermined positions on the light path of the converging optical system with almost no occurrence of the spherical aberration, and a lens moving mechanism for moving some lenses of the lens unit constituting the converging optical system and further changing the arranging interval (air spacing) thereof.

According to a fifth aspect of the present invention, a minute particle optical manipulation apparatus according to the third or fourth aspect may further comprise an observation optical system, including a part of the whole of the converging optical system, for observing the minute particle, wherein the observation optical system is provided with a correcting mechanism for correcting the plus spherical aberration of the converging optical system or an in-focus position of the observation optical system.

Thus, in the minute particle optical manipulation apparatus according to the fifth aspect, the observation optical system containing a part of the whole of the converging optical system is provided with the correction mechanism for correcting the plus spherical aberration of the converging optical system or the in-focus position of the observation optical system. Therefore, the observation optical system shares a part or the whole of the converging optical system for generating the cone-shaped converged beam having the plus spherical aberration. Even if the spherical aberration and a defocus occur in the observation optical system due to the above configuration, the correction mechanism is capable of correcting the spherical aberration and the defocus, and it is therefore possible to prevent an occurrence of such a situation that an observed image of the minute particle is viewed in blur when observing the minute particle through the observation optical system with the result that only a low contrast is obtained.

According to a sixth aspect of the present invention, in a minute particle optical manipulation apparatus according to the third or fourth aspect, the observation optical system for observing the minute particle is provided independently of the converging optical system.

Thus, in the minute particle optical manipulation apparatus according to the sixth aspect of the present invention, the observation optical system is provided independently of the converging optical system, and hence it is feasible to avoid the spherical aberration and the defocus from occurring in the observation optical system because of sharing a part or the whole of the converging optical system. It is therefore possible to prevent an occurrence of such a situation that the observed image of the minute particle is viewed in blur when observing the minute particle through the observation optical system with the result that only the low contrast is obtained.

Next, in a minute particle optical manipulation apparatus according to a seventh aspect of the present invention, an axial chromatic aberration Δ of observation light on the basis of trapping light in the converging optical system is set to have a predetermined negative value. In this case, the converging position of a converged beam which is generated when parallel beams of the trapping light enter the converging optical system is farther from the converging optical system than the in-focus position with respect to the converging optical system which serves as an objective lens in the observation system only by a predetermined distance (that is, the axial chromatic aberration Δ) along the optical axis of the converging optical system.

Consequently, in the minute particle optical manipulation apparatus according to the seventh aspect of the present invention, the converging position of the converged beam is moved toward the converging optical system along the optical axis in order to observe an excellent image of a minute particle with high contrast by making the position of the minute particle which is trapped by the action of the converged beam (and the converging position of the converged beam, in its turn) substantially coincident with the in-focus position. In this case, upon movement of the converging position of the converged beam toward the converging optical system, a plus spherical aberration is given to the converged beam. As a result, as will be described later, it is possible to maintain the trapping force (the force for trapping a minute particle) stably and strongly by the action of the converged beam with the plus spherical aberration given thereto. It is also possible to observe an excellent image of the minute particle with high contrast since the converging position of the converged beam is substantially coincident with the in-focus position.

Description will be made below on the point that the force for trapping a minute particle can be stably maintained strong by giving the plus spherical aberration to the converged beam. The present inventor has found that, by varying a condition of a light beam applied on a minute particle in a medium and calculating the trapping force in the direction of the optical axis in each case, the trapping force in the direction of the optical axis is strengthened when a plus spherical aberration is intentionally given to a converged beam applied on the minute particle in the medium. Then, as a result of intense examinations based on this founding, it is confirmed that, when a minute particle in a medium is irradiated with a converged beam having a plus spherical aberration, not only the strength of the trapping force in the direction of the optical axis is increased, but also the range over which the trapping force is exerted in the direction of the optical axis is expanded, and moreover, a sufficiently strong trapping force can be obtained even when the minute particle is present at a deep position inside the medium, that is, a position far from the converging optical system, and the distance the converged beam travels through the medium is considerably long.

Note that, in the minute particle optical manipulation apparatus according to the seventh aspect of the present invention, it is desirable that the axial chromatic aberration Δ of an observation light when using the trapping light in the converging optical system as a basis satisfied the following condition (1):

$$-10 \leq \Delta/\varnothing \leq -0.12 \quad (1)$$

where Ø is the size (for example, the diameter) of the minute particle.

Below the lower limit of the condition (1), the absolute value of the axial chromatic aberration Δ is too large so that the spherical aberration is generated in a large amount in a state in which the converging position of the converged beam is substantially coincident with the in-focus position and the trapping force of the minute particle becomes small undesirably. On the other hand, above the upper limit of the condition (1), the trapping force of the minute particle can not be stably maintained strong undesirably since the absolute value of the axial chromatic aberration Δ is too small so that the plus spherical aberration can not be given to the converged beam sufficiently. Note that, in order to exhibit the effects of the present invention more excellently it is more desirable that the lower limit of the condition (1) is set at −5 and the upper limit at −0.25.

DESCRIPTION OF THE PREFERRED EMBODIMENTS

Embodiments of the present invention will hereinafter be described with reference to the accompanying drawings.

Figure 1:
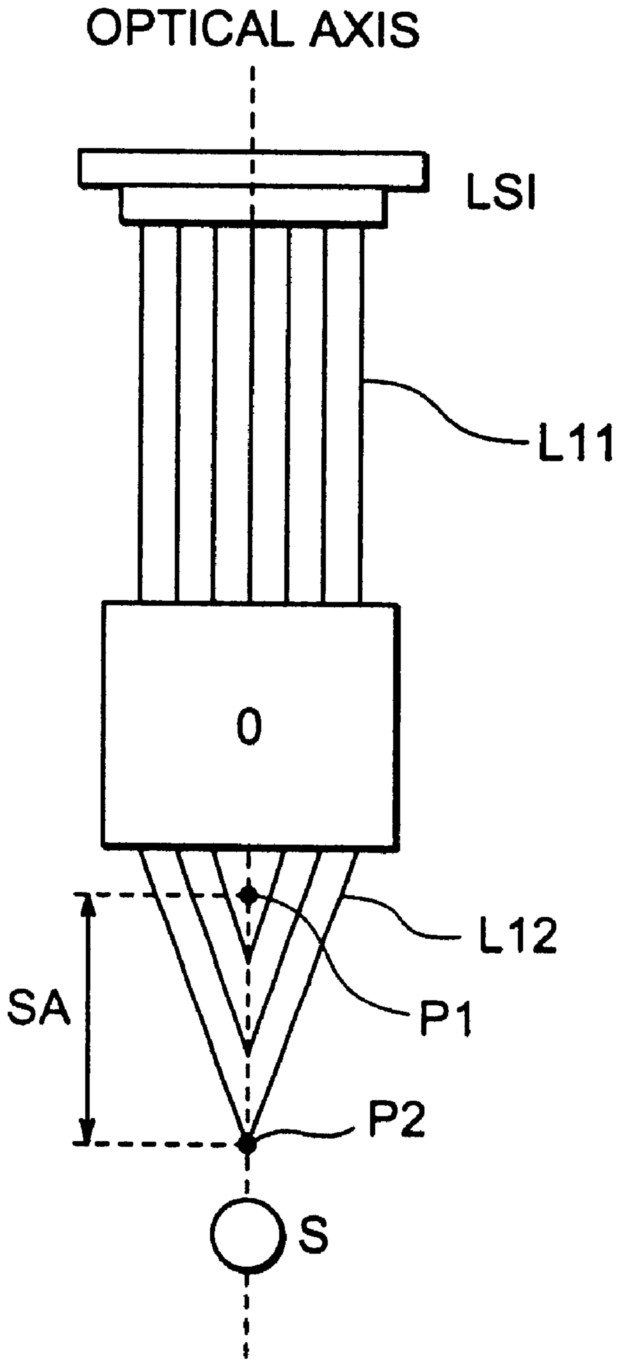
FIG. 1 is a view showing a whole configuration of a minute particle optical manipulation apparatus in first embodiment of the present invention.
Figure 2:
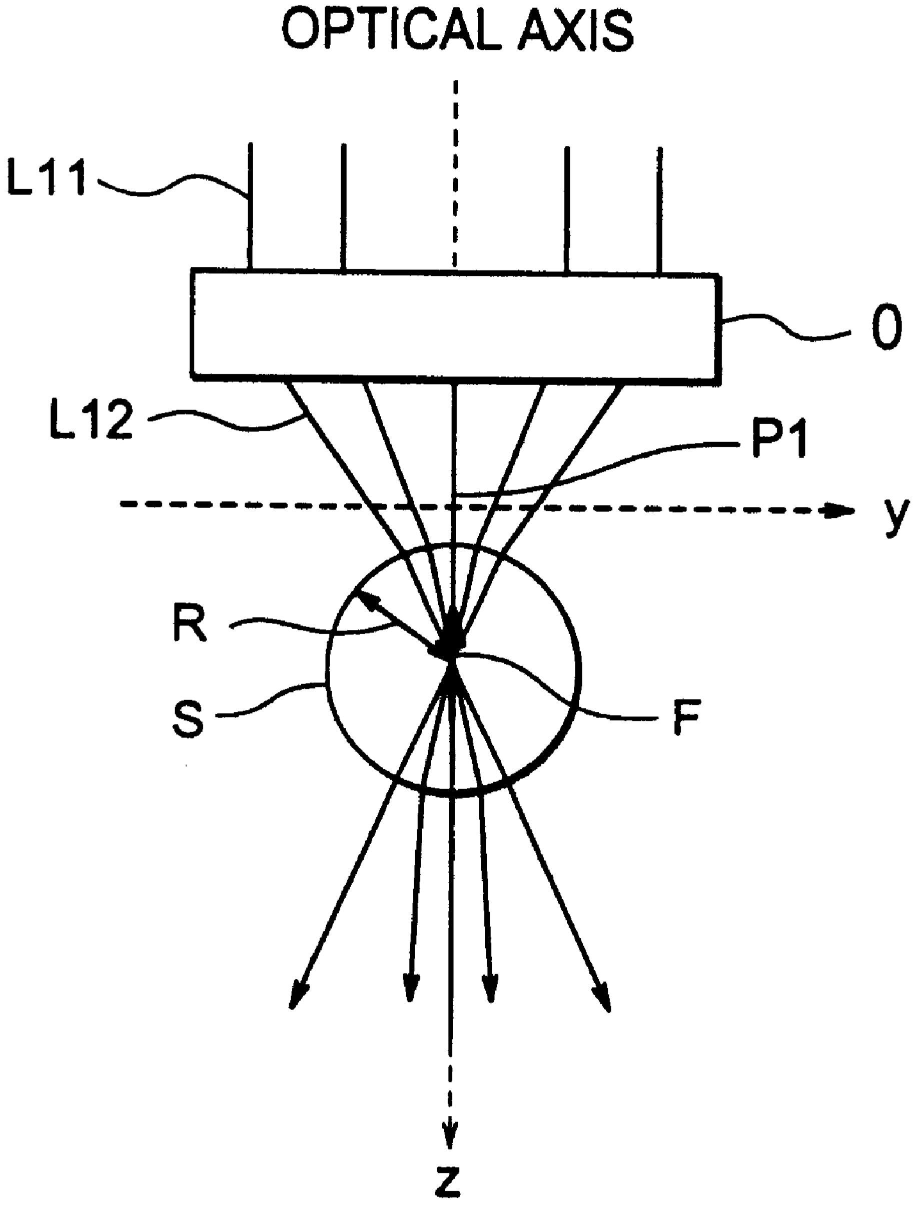
FIG. 2 is an explanatory view showing how a minute particle is trapped and manipulated by use of the manipulation apparatus shown in FIG. 1.
Figure 3:
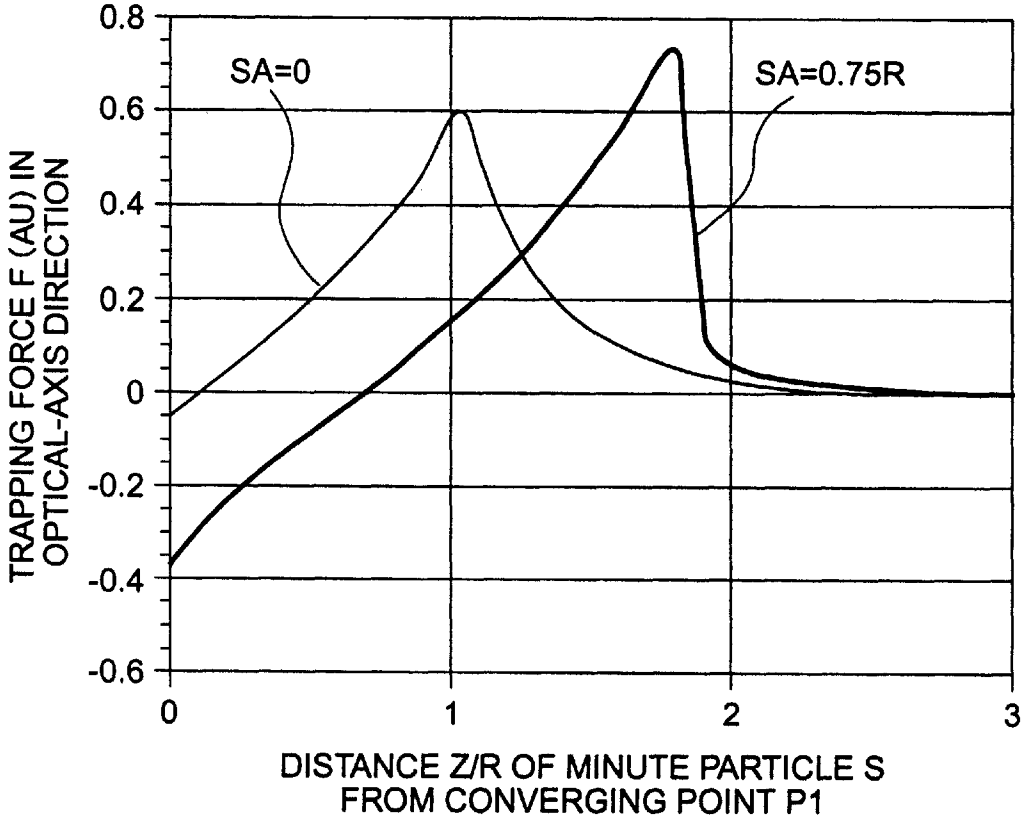
FIG. 3 is a graph showing a comparison between a trapping force when a cone-shaped converged beam with which a minute particle is irradiated has a plus spherical aberration and a trapping force when having no spherical aberration.
Figure 5A:
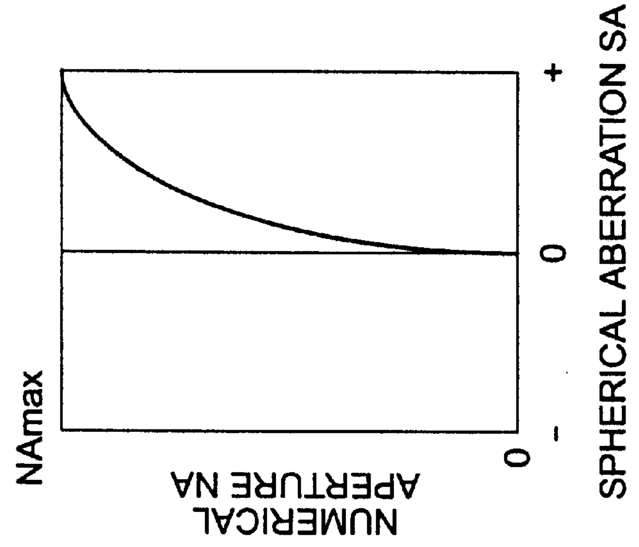
FIGS. 5A to 5C are graphs each showing a relationship between a spherical aberration and a numerical aperture NA in the converging optical system of the manipulation apparatus shown in FIG. 1.
Figure 5B:
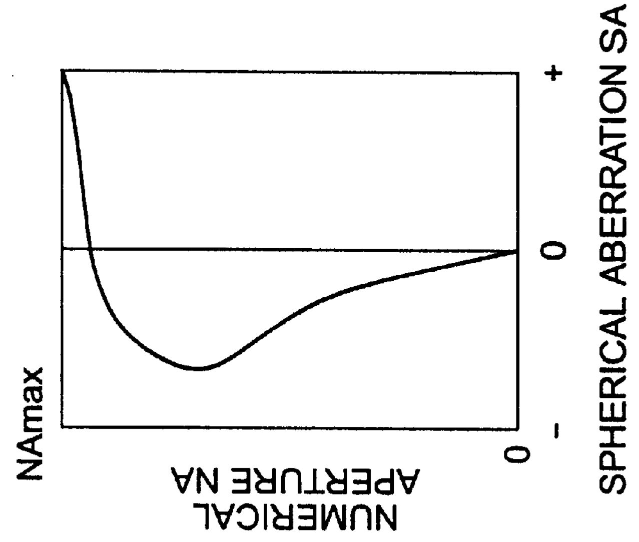
Figure 5C:
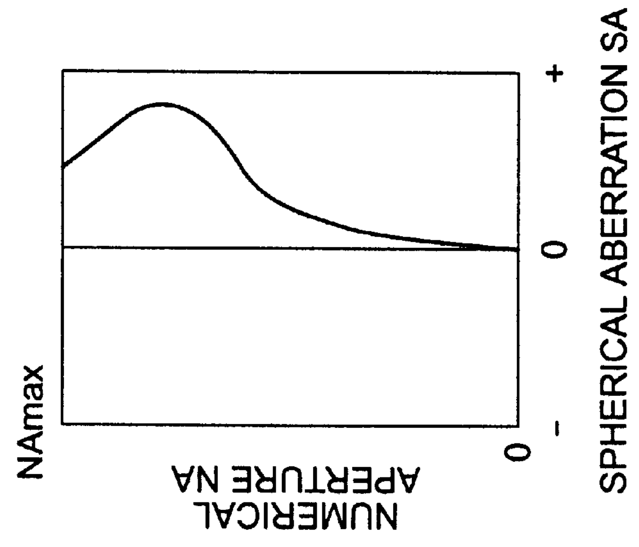

FIG. 1 is view showing a whole configuration of an apparatus for optically manipulating minute particles in one embodiment of the present invention. FIG. 2 is an explanatory view showing how the minute particle is trapped and manipulated by use of the manipulating apparatus shown in FIG. 1. FIG. 3 is a trapping force versus distance graph showing a comparison between a trapping force when a cone-shaped converging beam falling on the minute particle exhibits a plus spherical aberration and a trapping force when having no spherical aberration. FIGS. 5A, 5B and 5C are graphs each showing a relationship between the spherical aberration and a numerical aperture NA in a converging optical system of the manipulating apparatus illustrated in FIG. 1.

As shown in FIG. 1, in the minute particle optical manipulation apparatus in this embodiment, a converging optical system O for converging, in a conical shape, parallel beam L11 for an optical tweezers, which is emitted from a light source LS1 for the optical tweezers, and for giving a predetermined plus spherical aberration SA to a cone-shaped converged beam L12, is provided on the optical axis of the light source LS1 for the optical tweezers. Therefore, a converging point P2 of maximum NA component beam passing through the converging optical system O extends a distance of the aspherical aberration SA farther from a converging point P1 of a paraxial ray.

The converging optical system O for giving the plus spherical aberration SA as described above may be, for example, a converging optical system designed and manufactured so as to generate the cone-shaped converging beam having the plus spherical aberration from the beginning. In addition to this converging optical system, as will specifically be exemplified in examples that will be discussed later on, there are a converging optical system having such a geometry that a transparent thin plane-parallel plate is disposed in a position in which to diverge or converge the beam on the light path of the normal converging optical system with almost no occurrence of the spherical aberration such as an existing microscope objective lens, a converging optical system in which a diffraction optical element for causing the spherical aberration is disposed on the light path, and a converging optical system in which some lenses of a lens unit configuring the converging optical system are shifted in the optical-axis direction, and an arranging interval (air spacing) is thus changed.

Further, this converging optical system O is, though the illustration is omitted, provided with a spherical aberration changing device for arbitrarily changing the predetermined plus spherical aberration SA given to the cone-shaped converged beam L12. This spherical aberration changing device may be, though specifically exemplified in the examples that will be explained later on, for example, a turret for replacing the plane-parallel plate and the diffraction optical element disposed on the light path of the normal converging optical system with almost no occurrence of the spherical aberration with other plane-parallel plate and diffraction optical element that exhibit different characteristics, and a lens moving device for changing the arranging interval (air spacing) by moving some lenses of the lens unit.

Next, an operation of the minute particle optical manipulation apparatus shown in FIG. 1 will be explained with reference to FIGS. 1 and 2.

To start with, as shown in FIG. 1, the parallel beam L11 emitted from the optical tweezers oriented light source LS1 is given the predetermined plus spherical aberration SA during a passage through the converging optical system O disposed on the optical axis thereof. Then, the parallel beam L11 becomes the cone-shaped converged beam L12 having the plus spherical aberration SA, of which the converging point P2 of the maximum NA component beam extends farther from the converging point P1 of the paraxial ray emitted from the converging optical system O.

Therefore, for example, if a minute particle S existing in a medium such as water is located within or in the vicinity of a range extending from the converging point P1 of the paraxial ray of the cone-shaped converged beam L12 having the plus spherical aberration SA to the converging point P2 of the maximum NA component beam, it follows that the minute particle S is entirely or partially irradiated with the cone-shaped converged beam L12.

Then, as shown in FIG. 2, if this cone-shaped converged beam L12 is reflected by the surface of the minute particle S or refracted inside the minute particle S to deflect its traveling direction, as a result a momentum of the converged beam L12 changes.

Herein, supposing that the minute particle S is a non-absorptive dielectric body as well as being a completely spherical body exhibiting a higher refractive index than the medium, a radiation pressure corresponding to the change in the momentum occurs on the minute particle S, whereby a trapping force F acts to make the minute particle S attracted toward the converging point P1 of the paraxial ray as indicated by a bold solid line in FIG. 2.

Thus, the minute particle S is trapped by the cone-shaped converged beam L12 having the plus spherical aberration SA, and necessary manipulations for this minute particle S are executed.

Now, it is assumed in FIG. 2 that the minute particle S is the non-absorptive dielectric body as well as being the completely spherical body having a refractive index n of 1.5 and a radius R and exists in the water as a medium of which a refractive index n is 1.3. Further, an assumption is that a diameter 2R of the minute particle S is long enough as compared with a wavelength λ of the converged beam L12, and specifically the radius is set such as R=40 λ. Moreover, the minute particle S exists in a comparatively shallow position in the water, and the converging point P1 of the paraxial ray of the converging optical system O is flush with the water surface, i.e., a water depth wd is 0.

Furthermore, the maximum numerical aperture NA of the converging optical system O is set to 1.25, and the spherical aberration SA thereof is set to 0.75. Moreover, the optical axis of the converging optical system O is taken as the z-axis, the converging point P1 of the paraxial ray is defined such as z=0, and the y-axis is taken through the converging point P1 in a direction perpendicular to the z-axis.

Then, if the minute particle S in the water is to exist in positions with different values of z on the optical axis of the converging optical system O, and, when calculating the trapping forces F caused about the minute particle S in these respective positions and acting in the optical-axis direction, a calculated result becomes as shown by a bold line in a graph in FIG. 3.

Herein, the axis of abscissas of the graph in FIG. 3 indicates a distance of the minute particle S from the converging point P1 in the z-axis direction, which is standardized by the radius R of the minute particle S, and the axis of ordinates indicates the trapping force F acting on the minute particle S in the optical-axis direction. Further, for comparison, the thin line in the graph in FIG. 3 indicates the trapping force F in the case of using the converging optical system having no spherical aberration, i.e., when the spherical aberration SA=0 (no aberration).

As obvious from this graph in FIG. 3, it can be understood that the trapping force F acting on the minute particle S in the optical-axis direction becomes larger in the case of irradiating the minute particle S in the water with the cone-shaped converged beam L12 having the plus spherical aberration SA given such as SA=0.75R than in the case of being irradiated with the cone-shaped converged beam having the spherical aberration SA given such as SA=0 (no aberration).

Thus, the minute particle optical manipulation apparatus in this embodiment is capable of obtaining the trapping force F acting stronger by giving the plus spherical aberration SA to the cone-shaped converged beam L12 falling on the minute particle S existing in the medium than when the spherical aberration SA is given such as SA=0 (no aberration).

By the way, the discussion has been made herein on the assumption that the spherical aberration SA of the cone-shaped converged beam L12 through the converging optical system O is given such as SA=0.75R. In terms of utilization, however, a desirable relationship is 0.2R≦SA=1.5R, and a more desirable relationship for obtaining most effectively the trapping force especially when the minute particle S exists in the comparatively shallow position in the water, is 0.2R≦SA≦1.0R.

Given next is an explanation of the trapping force F acting on the minute particle S in a case where the water depth wd of the converging point P1 of the paraxial ray of the converging optical system O.

Figure 4A:
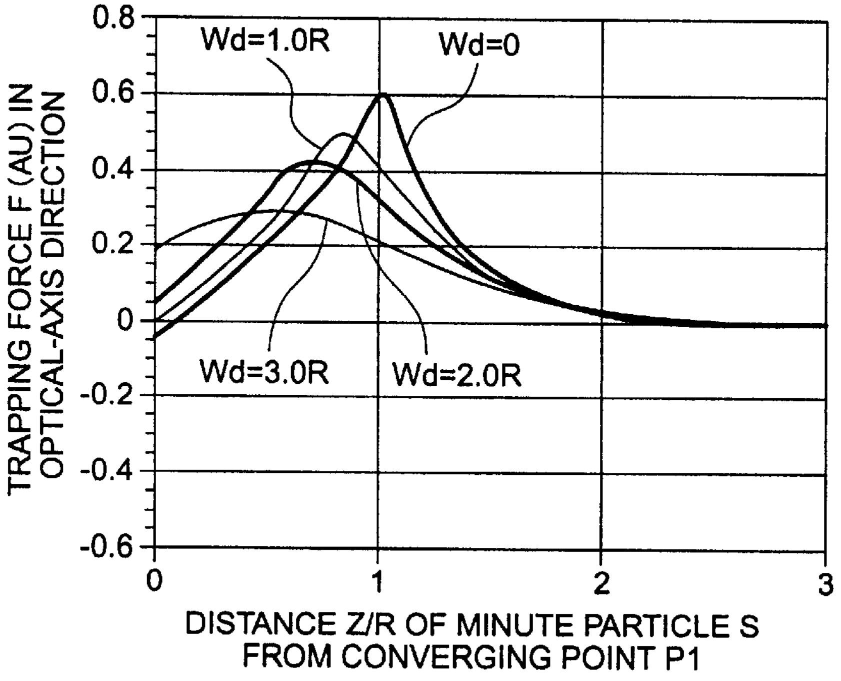
FIGS. 4A and 4B are graphs each showing a comparison between the trapping force when the cone-shaped converged beam with which the minute particle is irradiated has the plus spherical aberration and the trapping force when having no spherical aberration, wherein a depth in which the minute particle exists in a medium is used as a parameter.

Now, referring to FIG. 2, when calculating the trapping forces F acting on the minute particle S in the optical-axis direction which are generated in the case of changing the water depth wd of the converging point P1 of the paraxial ray of the converging optical system O such as wd=0, wd=1.0R, wd=0.2R and wd=3.0R, the calculated result becomes as shown in a graph in FIG. 4A.

Figure 4B:
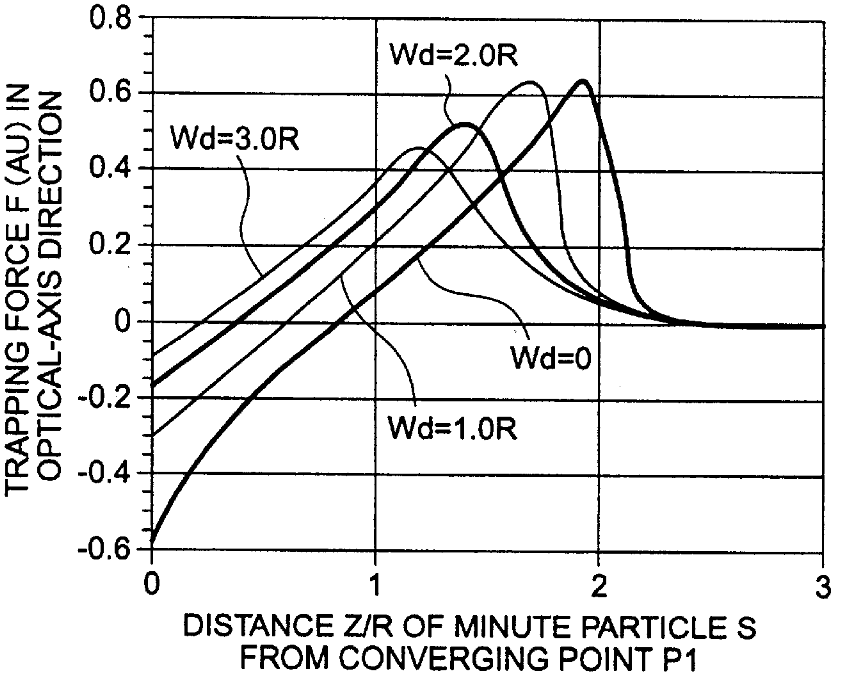

Herein, the axis of abscissas of each of the graphs in FIGS. 4A and 4B indicates a distance of the minute particle S from the converging point P1 in the z-axis direction, which is standardized by the radius R of the minute particle S, and the axis of ordinates indicates the trapping force F acting on the minute particle S in the optical-axis direction.

Note that the water depth, given by wd=0, of the converging point P1 of the paraxial ray corresponds to a state where an in-focus position of the converging optical system O is adjusted to an undersurface of a slide glass covering the water surface of the water as the medium, and the converged beam L12 converges on the water surface. The state of changing the water depth wd of the converging point P1 of the paraxial ray such as wd=1.0R, wd=2.0R and wd=3.0R, corresponds to a state where the in-focus position of the converging optical system O is shifted gradually deeper under the water surface from the under surface of the slide glass.

Further, FIG. 4B is a graph showing the trapping forces F for comparison when the water depth wd of the converging point is changed such as wd=0, 1.0R, 2.0R and 3.0R in the case of using the converging optical system with no spherical aberration, i.e., the spherical aberration SA=0 (no aberration).

As apparent from the graphs in FIGS. 4A and 4B, if the water depth wd of the converging point P1 of the paraxial ray ranges from 1.0R to 3.0R, i.e., if the minute particle S exists in a comparatively shallow position in the water, it can be understood that the trapping force F acting on the minute particle S in the optical-axis direction becomes larger in the case of irradiating the minute particle S in the water with the cone-shaped converged beam L12 having the plus spherical aberration SA given such as SA=1.0R than in the case of being irradiated with the cone-shaped converged beam having the spherical aberration SA given such as SA=0 (no aberration).

Further, similarly when the water depth wd of the converging point P1 of the paraxial ray is given such as wd=0, i.e., when the minute particle S exists in an in-water shallow position in the vicinity of the water surface, it can be understood that there is held substantially the same magnitude of trapping force F acting on the minute particle S in the optical-axis direction in the case of irradiating the minute particle S in the water with the cone-shaped converged beam L12 having the plus spherical aberration SA given by SA=1.0R as in the case of being irradiated with the cone-shaped converged beam having the spherical aberration SA given by SA=0 (no aberration).

Thus, the minute particle optical manipulation apparatus in this embodiment is, even if the minute particle S exists in the comparatively shallow position in the medium, capable of obtaining the trapping force F acting stronger by giving the plus spherical aberration SA to the cone-shaped converged beam L12 falling on the minute particle S existing in the medium than in the conventional case of being irradiated with the cone-shaped converged beam having the spherical aberration SA=0 (no aberration).

Besides, at this time, the trapping force F when the minute particle S exists in the comparatively shallow position in the medium can hold substantially the same magnitude as in the case of being irradiated with the cone-shaped converged beam with the spherical aberration SA given such as SA=0 (no aberration).

By the way, the discussion has been made herein on the assumption that the spherical aberration SA of the cone-shaped converged beam L12 through the converging optical system O is given such as SA=1.0R. In terms of utilization, however, a desirable relationship is 0.2R≦SA≦1.5R, and a more desirable relationship for obtaining most effectively the trapping force especially when the minute particle S exists in the comparatively deep position in the water, is 0.75R≦SA≦1.5R.

Note that the calculations for obtaining the graphs in FIGS. 3 and 4 were made by use of a ray tracing approximation method in which the converged beam L12 is presumed to be an aggregation of rays, the radiation pressure occurred about the minute particle S is calculated for every ray, and the thus calculated radiation pressures are totaled.

Further, in the converging optical system O used in the minute particle optical manipulation apparatus shown in FIG. 1, even when the maximum NA component beam of the cone-shaped converged beam L12 has the plus spherical aberration SA, this spherical aberration SA may take a variety of distributions with respect to the NA component as shown in FIGS. 5A, 5B and 5C.

In accordance with this embodiment, as shown in FIG. 5A, the most desirable result can be obtained when the spherical aberration SA simply increases in the plus direction with respect to the increase in the NA component. Then, as shown in FIG. 5C, what is desirable next is a case where the spherical aberration SA increases in the plus direction with respect to the increase in the NA component, and a peak is reached with a certain fixed NA component. Still another desirable case next thereto is, as shown in FIG. 5B, that the spherical aberration SA increases temporarily in the minus direction with respect to the increase in the NA component, and increases in turn in the plus direction with a certain fixed NA component.

FIRST EXAMPLE

Figure 6A:
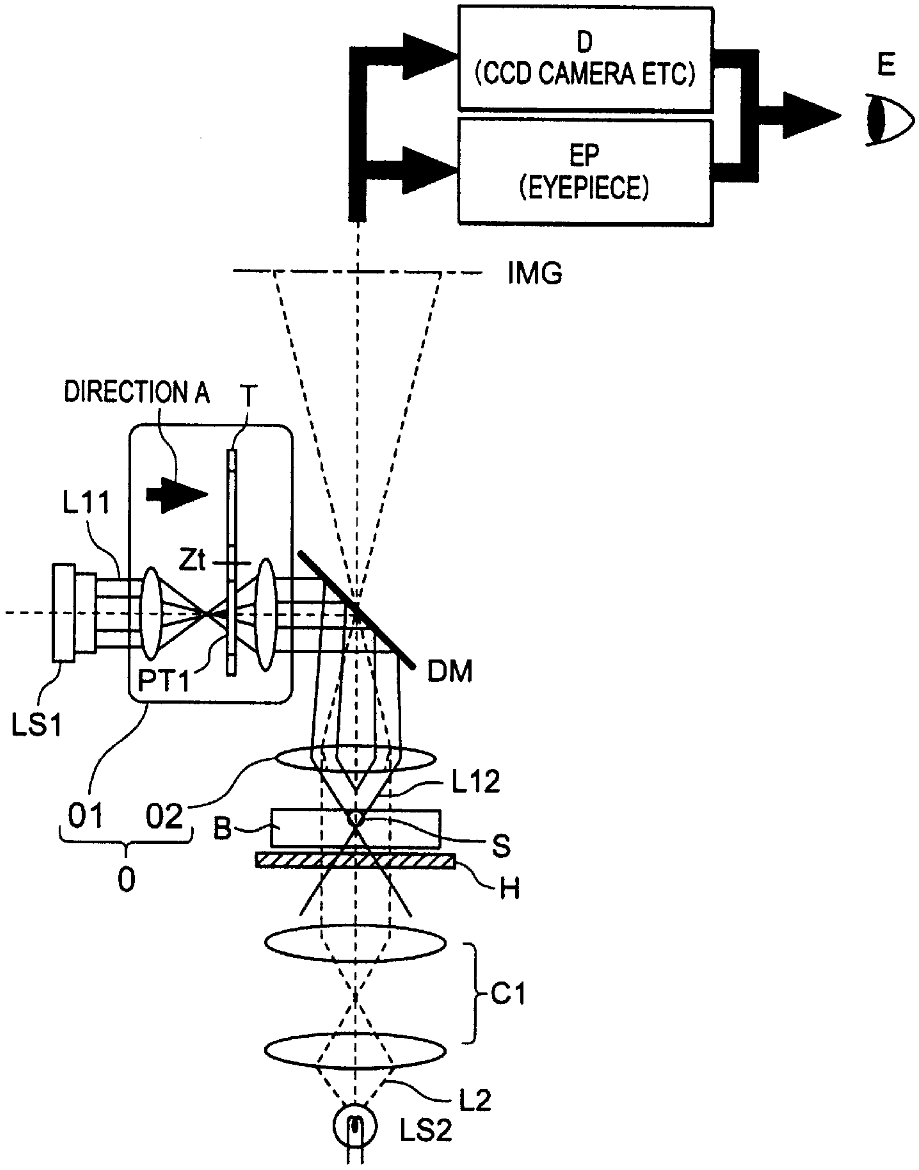
FIG. 6A is a view showing a whole configuration of the minute particle optical manipulation apparatus in a first example of the present invention.
Figure 6B:
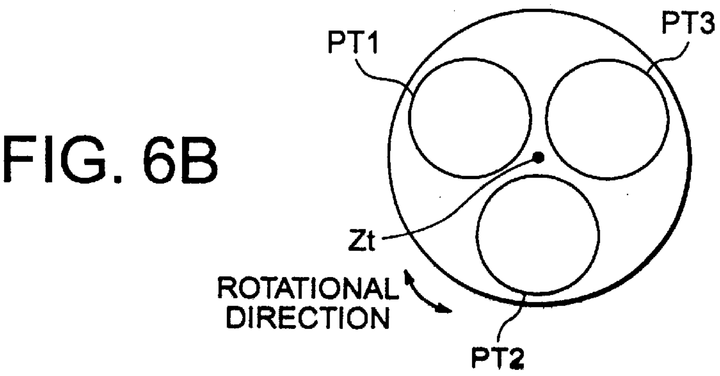
FIG. 6B is a view taken in an arrow direction A, showing a turret partially constituting the manipulation apparatus shown in FIG. 6A.

FIG. 6A is a view showing a whole configuration of the minute particle optical manipulation apparatus in a first example of the present invention. FIG. 6B is a view taken in an arrow direction A, showing the turret partially constituting the manipulating apparatus shown in FIG. 6A. Note that the same components as those of the minute particle optical manipulation apparatus illustrated in FIGS. 1 and 2, are marked with the like numerals, and their repetitive explanations are omitted.

As shown in FIG. 6A, in the minute particle optical manipulation apparatus in the first example, there are disposed the optical tweezers oriented light source LS1 for emitting the beam for optical tweezers, the optical system O1 for diverging the parallel beam L11 emitted from the optical tweezers oriented light source LS1, a dichroic mirror DM for reflecting downwards the beam diverged by the optical system O1, and an optical system O2 constructed of a microscope objective lens for converging the beam traveling from the dichroic mirror DM.

Then, the optical system for diverging the parallel beam L11 from the optical tweezers oriented light source LS1 is combined with the optical system O2 constructed of the microscope objective lens for converging the beam traveling from the dichroic mirror DM, thereby actualizing a converging optical system O for giving the plus spherical aberration SA shown in FIGS. 1 and 2.

Figure 11:
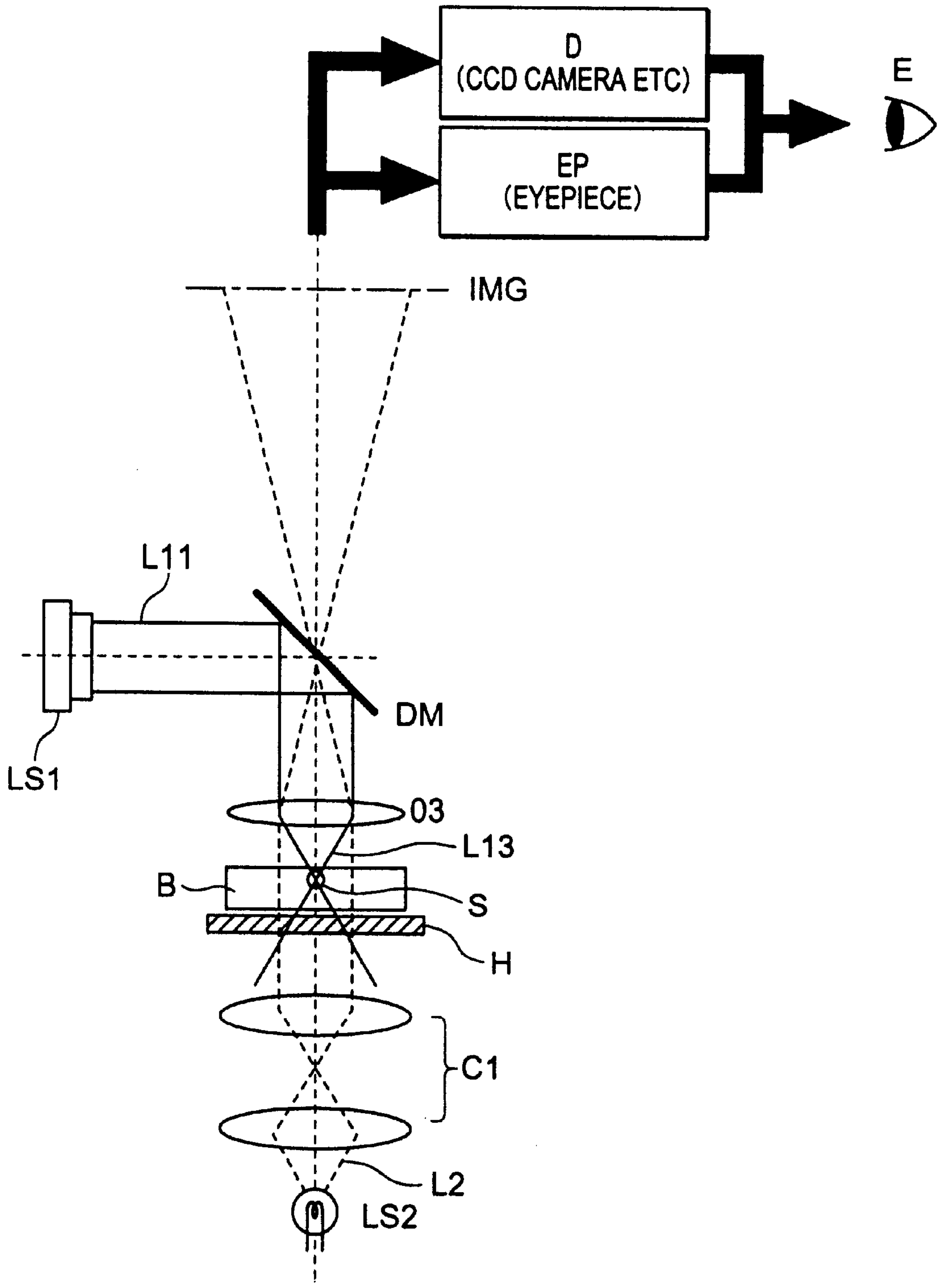
FIG. 11 is a view schematically showing optical tweezers in the prior art.
Figure 12:
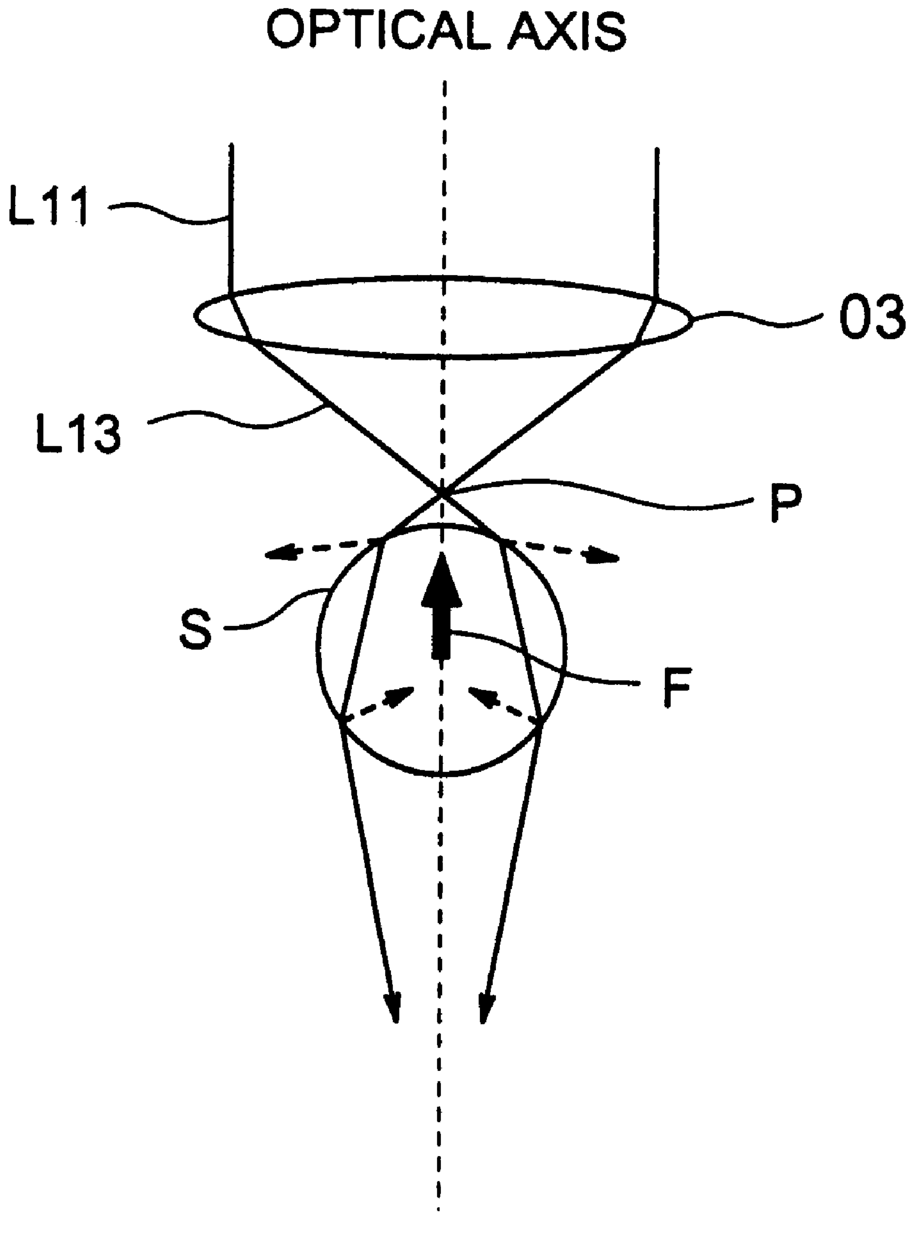
FIG. 12 is an explanatory partially enlarged view of FIG. 11, showing how the optical tweezers manipulate a minute particle S.

The minute particle optical manipulation apparatus in the first example takes, as compared with the conventional example shown in FIG. 11, a structure in which the optical system O1 for diverging the parallel beam L11 emitted from the optical tweezers oriented light source LS1 is disposed between the optical tweezers oriented light source LS1 and the dichroic mirror DM.

Further, the optical system O1 for diverging the parallel beam L11 from the optical tweezers oriented light source LS1 includes a transparent, thin plane-parallel plate PT1 disposed in a position where the beam between two lenses facing to each other diverges.

Moreover, as shown in FIGS. 6A and 6B, this plane-parallel plate PT1 is incorporated into the turret T and is arbitrarily replaceable by rotating the turret T about a rotary axis Zt with other plane-parallel plates PT2, PT3 each incorporated into the turret T and having different characteristics of a thickness, a refractive index etc. from the plane-parallel plate PT1.

Thus, the plane-parallel plate PT1 in the optical system O1 for diverging the parallel beam L11 from the optical tweezers oriented light source LS1 is arbitrarily replaced with other plane-parallel plates PT2, PT3 exhibiting the different characteristics, thereby arbitrarily changing a degree of the divergence in the optical system O1 and more essentially adjusting a magnitude of the spherical aberration SA given in the converging optical system O. It is therefore feasible to select an optimum spherical aberration SA in accordance with conditions such as the refractive index of the minute particle S and a depth in which to trap the minute particle S in the optical-axis direction, and so on.

As discussed above, in the minute particle optical manipulation apparatus shown in FIGS. 6A and 6B, the optical system O1 for diverging the parallel beam L11 from the optical tweezers oriented light source LS1, more precisely, the transparent thin plane-parallel plate PT1 disposed between the two lenses facing to each other functions as a spherical aberration generating element for giving the plus spherical aberration SA. Then, the turret T is capable of arbitrarily replacing this plane-parallel plate PT1 with other plane-parallel plates PT2, PT3 exhibiting the different characteristics, functions as the spherical aberration changing device.

Thus, the minute particle S existing in a medium B held by a holder H such as a Petri dish and a slide glass is irradiated with the cone-shaped converged beam L12 given the predetermined plus spherical aberration SA during the passage through the converging optical system O, and is trapped for executing necessary manipulations about this minute particle S.

Figure 9:
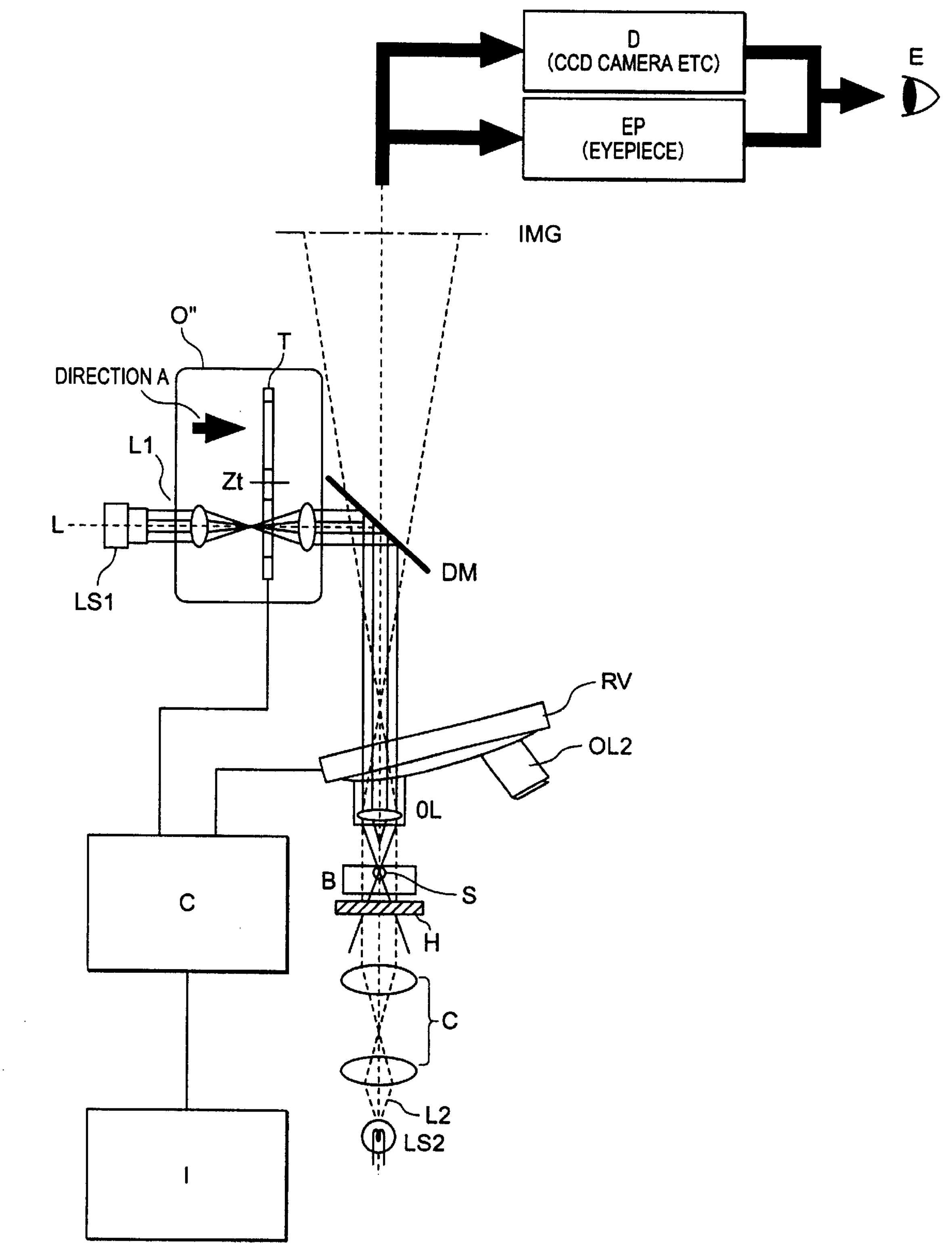
FIG. 9 is a view showing a whole configuration of the minute particle optical manipulation apparatus in a fourth example of the present invention.

Further, as shown in FIG. 6A, the minute particle optical manipulation apparatus in the first example is provided with the same observation optical system as that in the conventional example shown in FIG. 9.

To be specific, illumination beam L2 for observation, which is emitted from an observation light source LS2 provided under the holder H passes through an illumination optical system C1 and falls over the vicinity of the minute particle S, and is thereafter converged through the optical system O2 constructed of the microscope objective lens partially constituting the converging optical system O for giving the plus spherical aberration SA.

Further, the observation illumination beam Ls selected herein is that having a wavelength different from that of the optical tweezers oriented beam emitted for the optical tweezers oriented light source LS1. Hence, the illumination beam L2, after being converged by the optical system O2, travels through the dichroic mirror DM without being reflected therefrom, and is projected on an image surface IMG to form an image thereon.

Then, the enlarged image of the minute particle S, which is formed on this image surface IMG, is viewed by an naked eye E through an imaging device D like a CCD camera etc. as well as through an eyepiece EP, thereby making it feasible to observe how the minute particle S in a medium B is trapped and manipulated.

Herein, the observation optical system extending from the observation light source LS2 to the image surface IMG shares the optical system O2 constructed of the microscope objective lens partially constituting the converging optical system O for giving the plus spherical aberration SA, but does not share the plane-parallel plate PT1 serving as the spherical aberration generating element for directly giving the plus spherical aberration SA. Hence, there is no necessity of correcting the spherical aberration in this observation optical system.

It is, however, desirable for observing in a high contrast the minute particle S trapped by the cone-shaped converged beam L12 given the plus spherical aberration SA to provide a mechanism (not shown) for correcting an in-focus position of the observation optical system. The reason why so is that if a size and a material of the minute particle S and a depth in the optical-axis direction are different, or if the plus spherical aberration SA given by the converging optical system O is changed, there shifts an optical-axis directional position where the minute particle S is held.

SECOND EXAMPLE

Figure 7:
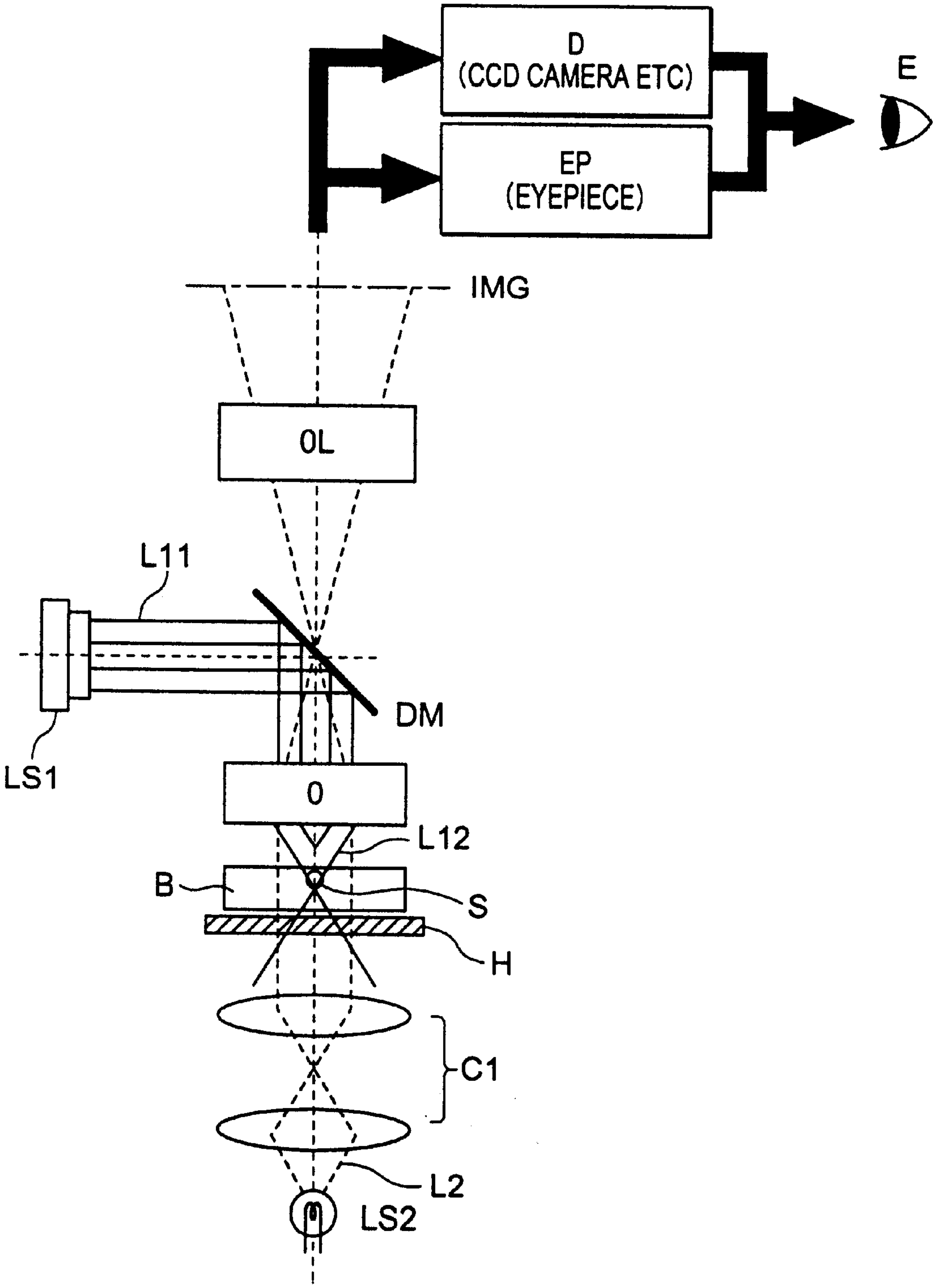
FIG. 7 is a view showing a whole configuration of the minute particle optical manipulation apparatus in a second example of the present invention.

FIG. 7 is a view showing a whole configuration of the minute particle optical manipulation apparatus in a second example of the present invention. Note that the same components as those of the minute particle optical manipulation apparatus illustrated in FIG. 6, are marked with the like numerals, and their repetitive explanations are omitted.

As shown in FIG. 7, in the minute particle optical manipulation apparatus in the second example, there are disposed the optical tweezers oriented light source LS1 for emitting the beam for optical tweezers, the dichroic mirror DM for reflecting downwards the beam from the optical tweezers oriented light source LS1, and a converging optical system O for converging the beam emerging from the dichroic mirror DM in a way that gives the predetermined plus spherical aberration SA thereto, i.e., the converging optical system O, shown in FIGS. 1 and 2, for giving the plus spherical aberration SA.

The minute particle optical manipulation apparatus in the second example takes, as compared with the conventional example shown in FIG. 11, a structure in which the converging optical system O for giving the plus spherical aberration SA is provided in the position where the normal converging optical system O is disposed.

Further, converging the optical system O for giving the plus spherical aberration SA is, though not illustrated, configured by combining, for example, a diffraction optical element for causing the spherical aberration with the optical system O2 constructed of the microscope objective lens shown in FIG. 6.

Then, as provided with the mechanism by which the plane-parallel plate PT1 incorporated into the turret T is, as shown in FIG. 6, arbitrarily replaceable by rotating the turret T with other plane-parallel plates PT2, PT3 each incorporated into the turret T, there is provided a mechanism by which this diffraction optical element incorporated into the turret T and is likewise arbitrarily replaceable by rotating the turret T with other diffraction optical elements each incorporated into the turret T and having different characteristics.

Thus, the diffraction optical element incorporated into the turret is arbitrarily replaced with other diffraction optical elements exhibiting the different characteristics, thereby adjusting a magnitude of the spherical aberration SA given in the converging optical system O. It is therefore feasible to select an optimum spherical aberration SA in accordance with conditions such as the refractive index of the minute particle S and a depth in which to trap the minute particle S in the optical-axis direction, and so on.

As discussed above, in the minute particle optical manipulation apparatus shown in FIG. 7, the converging optical system O for giving the plus spherical aberration, more precisely, the diffraction optical element constituting this converging optical system O functions as the spherical aberration generating element for giving the plus spherical aberration SA. Then, the turret capable of arbitrarily replacing this diffraction optical element with other diffraction elements exhibiting the different characteristics, functions as the spherical aberration changing device.

Thus, the minute particle S existing in the medium B held by the holder H such as the Petri dish and the slide glass is irradiated with the cone-shaped converged beam L12 given the predetermined plus spherical aberration SA during the passage through the converging optical system O, and is trapped for executing necessary manipulations about this minute particle S.

Further, as shown in FIG. 7, the minute particle optical manipulation apparatus in the second example is provided with the same observation optical system as that in the conventional example shown in FIG. 11.

To be specific, the illumination beam L2 for observation, which is emitted from the observation light source LS2 provided under the holder H passes through the illumination optical system C1 and falls over the vicinity of the minute particle S, and is thereafter converged by the converging optical system O for giving the plus spherical aberration SA.

Further, as in the first example illustrated in FIG. 6, the observation illumination beam Ls selected herein is that having a wavelength different from that of the optical tweezers oriented beam emitted for the optical tweezers oriented light source LS1. Hence, the illumination beam L2, after being converged through the converging optical system O, travels through the dichroic mirror DM without being reflected therefrom, and is projected on the image surface IMG to form an image thereon.

This observation optical system, however, shares the whole of the converging optical system O for giving the plus spherical aberration SA and not only the optical system composed of the microscope objective lens but also the diffraction optical element serving as the spherical aberration generating element for directly giving the plus spherical aberration SA. Hence, there is a necessity of correcting the spherical aberration given in the converging optical system. For this reason, a correction optical system OL for correcting the spherical aberration SA occurred in the converging optical system O is provided between the dichroic mirror DM and the image surface IMG.

Then, the enlarged image of the minute particle S, which is formed on the image surface IMG after the spherical aberration SA has been corrected by the correction optical system OL, is viewed by the naked eye E through an imaging device D like the CCD camera etc. as well as through the eyepiece EP, thereby making it feasible to observe how the minute particle S in the medium B is trapped and manipulated.

Herein, it is the same as the first example that it is desirable for observing in a high contrast the minute particle S trapped by the cone-shaped converged beam L12 given the plus spherical aberration SA to provide the mechanism (not shown) for correcting an in-focus position of the observation optical system.

THIRD EXAMPLE

Figure 8:
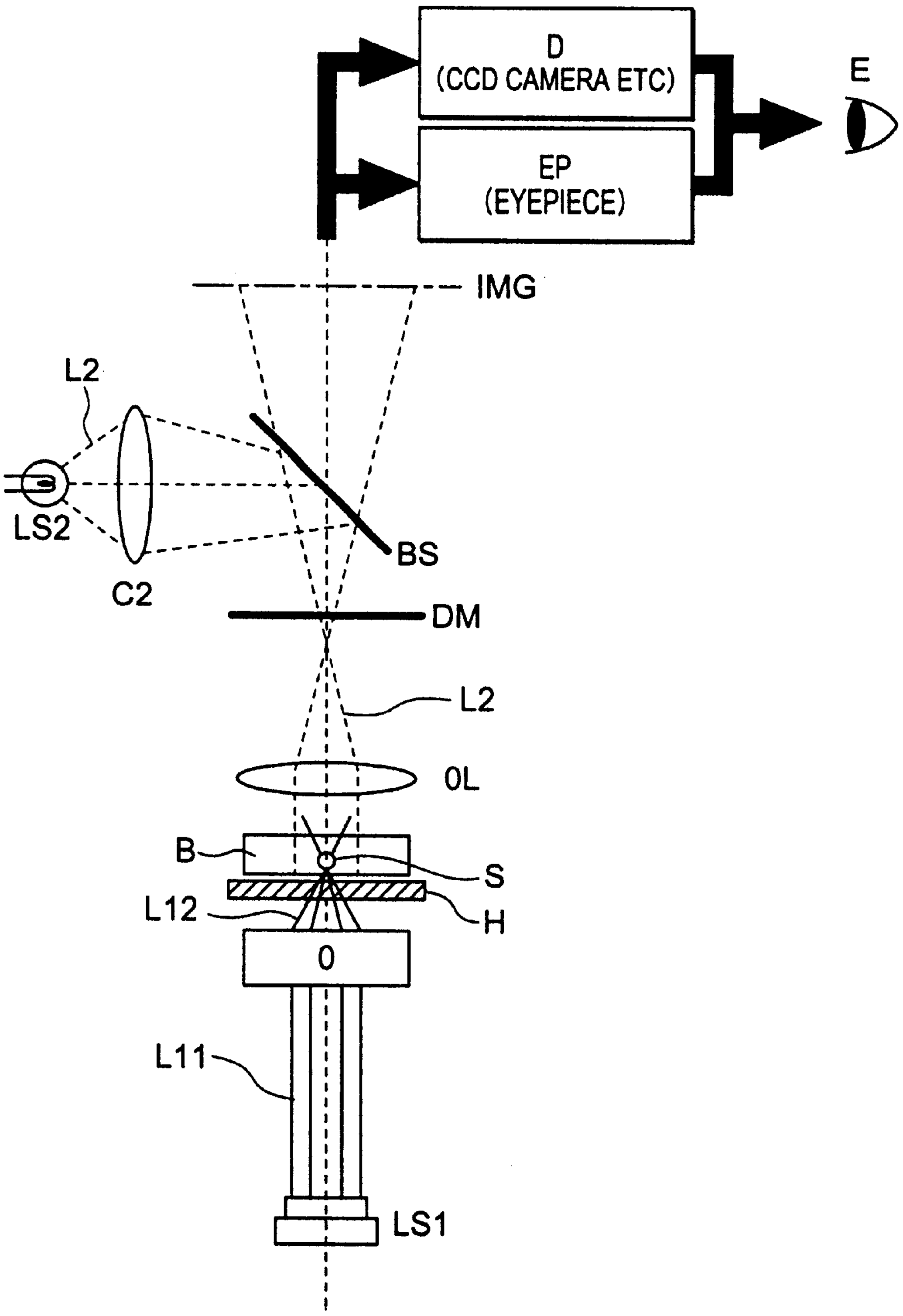
FIG. 8 is a view showing a whole configuration of the minute particle optical manipulation apparatus in a third example of the present invention.

FIG. 8 is a view showing a whole configuration of the minute particle optical manipulation apparatus in a third example of the present invention. Note that the same components as those of the minute particle optical manipulation apparatus illustrated in FIG. 7, are marked with the like numerals, and their repetitive explanations are omitted.

As shown in FIG. 8, in the minute particle optical manipulation apparatus in the third example, there are disposed the optical tweezers oriented light source LS1 for emitting the beam for optical tweezers, and the converging optical system O for converging the parallel beam L11 emitted from the optical tweezers oriented light source LS1 in a way that gives the predetermined plus spherical aberration SA thereto, i.e., the converging optical system O, shown in FIGS. 1 and 2, for giving the plus spherical aberration SA.

The minute particle optical manipulation apparatus in the third example takes, as compared with the conventional example shown in FIG. 11, a structure in which the converging optical system O for shaping the conical converged beam, given the plus spherical aberration SA, with which the minute particle S is irradiated, is provided under the holder H for holding the medium B in which the minute particle S exists.

Further, the converging optical system O for giving the plus spherical aberration SA is, though not illustrated, an optical system configured to generate the spherical aberration by changing the arranging interval (air spacing) in the lens unit of the converging optical system constructed of, for instance, a plurality of normal microscope objective lenses. The converging optical system O is, so to speak, what the converging optical system itself if given the plus spherical aberration SA.

Then, this converging optical system composed of the plurality of microscope objective lenses is provided with a lens moving mechanism capable of arbitrarily changing the arranging interval (air spacing).

Therefore, the arranging interval (air spacing) in the lens unit is arbitrarily changed, thereby adjusting a magnitude of the spherical aberration SA given in the converging optical system O. It is therefore feasible to select an optimum spherical aberration SA in accordance with conditions such as the refractive index of the minute particle S and a depth in which to trap the minute particle S in the optical-axis direction, and so on.

Thus, in the minute particle optical manipulation apparatus shown in FIG. 8, the converging optical system O for giving the plus spherical aberration SA, i.e., the converging optical element itself with the contrivance that the arranging interval in the lens unit is changed, functions as the spherical aberration generating element for giving the plus spherical aberration SA. Then, the lens moving mechanism capable of arbitrarily changing the arranging interval (air spacing) by moving some lens elements of the lens unit in the optical-axis direction, functions as the spherical aberration changing device.

Thus, the minute particle S existing in the medium B held by the holder H such as the Petri dish and the slide glass is irradiated from under with the cone-shaped converged beam L12 given the predetermined plus spherical aberration SA during the passage through the converging optical system O, and is trapped for executing necessary manipulations about this minute particle S.

Further, as shown in FIG. 8, the observation optical system in the minute particle optical manipulation apparatus in the third example, is provided above the minute particle S in the medium B held by the holder H.

Namely, the observation illumination beam L2 emitted from the observation light source LS2 provided above the holder H passes through the illumination optical system C2 and is reflected downwards by a beam splitter BS. Then, the illumination beam L2 illuminates over the vicinity of the minute particle S via the objective lens OL.

Then, the enlarged image of the minute particle S, which is formed on the image surface IMG, is viewed by the naked eye E through the imaging device D like the CCD camera etc. as well as through the eyepiece EP, thereby making it feasible to observe how the minute particle S in the medium B is trapped and manipulated.

Herein, the observation optical system extending from the observation light source LS2 to the imaging surface IMG is provided independently of the converging optical system O for giving the plus spherical aberration SA. Hence, there is no necessity of correcting the spherical aberration in this observation optical system.

Further, it is desirable for observing in a high contrast the minute particle S trapped by the cone-shaped converged beam L12 given the plus spherical aberration SA to provide the mechanism (not shown) for correcting an in-focus position of the observation optical system, which is the same as the second example.

FOURTH EXAMPLE

A fourth example will be explained referring to FIG. 9. FIG. 9 shows a configuration in which an electric revolver RV, a control unit C and an input device I are added so that the minute particle can be observed while switching a plurality of objective lenses $OL_1$, $OL_2$, $OL_3$ each having a different magnification, and the operations of the turret T and the revolver RV are automated. The same members as those in the examples discussed above are marked with the like numerals, and their repetitive explanations are omitted. The turret T and the revolver RV are fitted with rotary motors (not shown), and the rotations thereof are controlled by signals transmitted from the control unit C. The input device I including, e.g., a switch, a keyboard etc. is connected to the control unit C. The user is able to switch over a magnification of the objective lens to a desired magnification by operating this input device I. At this time, the control unit C transmits the signal for revolving the revolver in order to switch over the objective lens, and at the same time selects one of plane-parallel plates PT1–PT3 (see FIG. 6B) that generates an aberration suited to the switched objective lens. The control unit C also transmits the signal for rotating the turret T. As a result, the laser beam for the optical tweezers is capable of keeping an optimum state of the aberration at all times, corresponding to the switchover of the objective lens.

Figure 10:
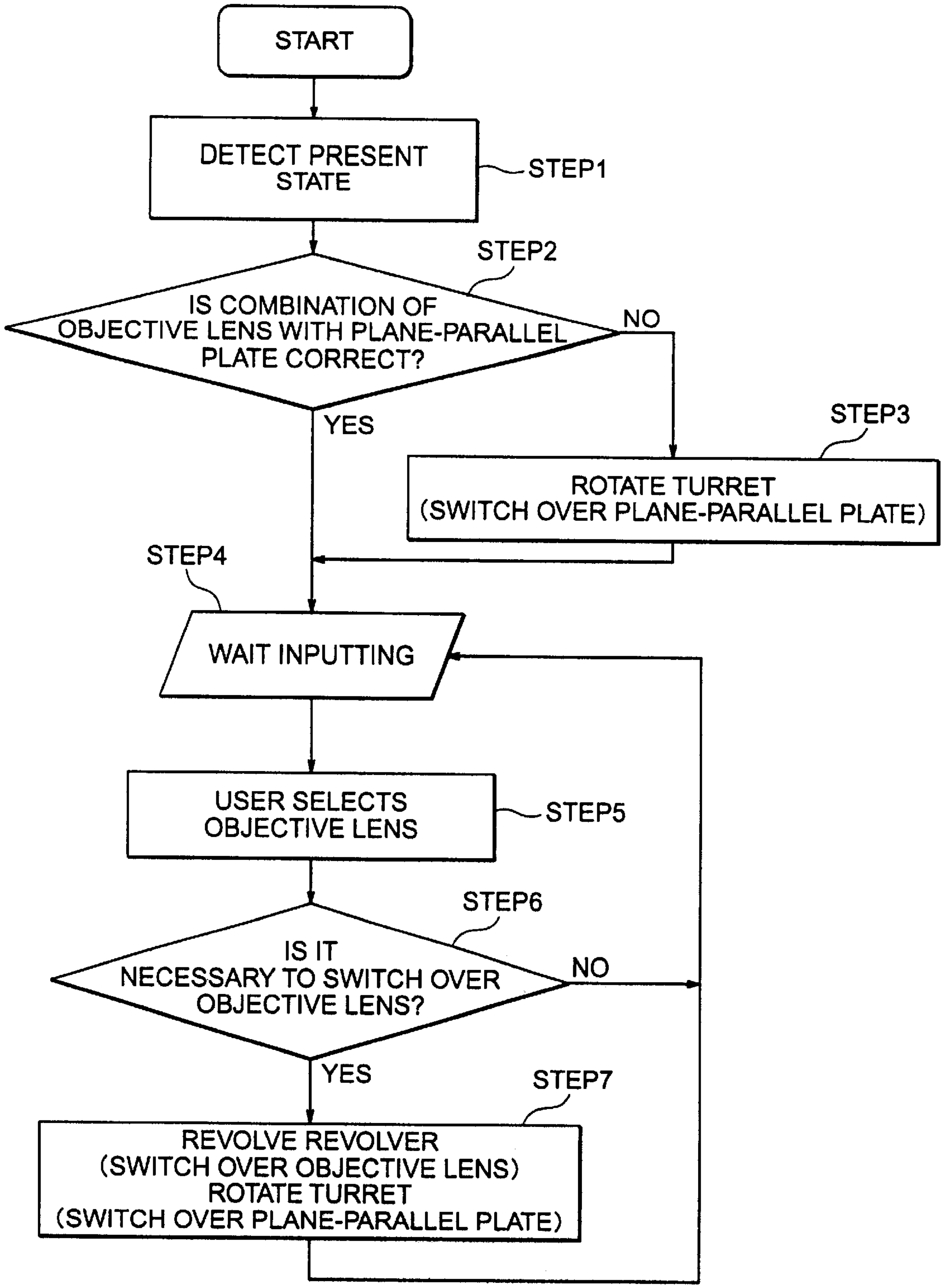
FIG. 10 is a flowchart showing an operation of a control unit in the fourth example.

The operation of this control unit C will be described with reference to a flowchart shown in FIG. 10. To start with, in STEP 1, the control unit C detects present positions of the revolver RV and the turret T when switching ON a power source. In STEP 2, the control unit C judges whether a combination of the objective lens existing in the detected position of the revolver RV with the plane-parallel plate existing in the detected position of the turret T, is proper or not. If the combination of the present objective lens with the plane-parallel plate is not proper, the turret T is rotated in STEP 3 to select the plane-parallel plate suited to the present objective lens. Thereafter, the control unit C enters a wait-for-input status in STEP 4. In STEP 5, when the user selects the objective lens by operating the input device I, a signal of this event is transmitted to the control unit C. In STEP 6, the control unit C judges whether or not the objective lens is required to be switched over. If required, in STEP 7, the control unit C controls the revolutions of the revolver to switch over the objective lens, then selects the plane-parallel plate suited to the switched objective lens, and rotates the turret. Then, the control unit C reverts again to the wait-for-input status in STEP 4.

With a repetition of the operations described above, even when the user selects an arbitrary objective lens, the plane-parallel plate suited to the selected objective lens is disposed on the light path. The laser beam for the optical tweezers is capable of keeping the optimum state of the aberration at all times.

Note that the sample may be illuminated with the beam by use of, e.g., the dark field illumination method and the oblique illumination method defined as the prior art microscope observation methods in order to obtain a clear observed image with a high contrast in the observation optical systems in the first through fourth examples given above. Further, the contrast of the observed image can be enhanced by use of the phase contrast observation method and the differential interference observation method similarly defined as the prior art methods. Moreover, the observation optical system may be constructed based on an optical geometry of a co-focus microscope, a near space optical microscope (NSOM) etc., which have been widely used over the recent years.

Further, the dichroic mirror showing the wavelength selectivity is used as an element for dividing the light paths of the converging optical system for the optical tweezers and of the observation optical system in the first through fourth examples. Other elements may, however, be used within the range of the concept of the present invention. The beams from the converging optical system for the optical tweezers and from the observation optical system are set in polarized states different from each other by use of, e.g., a polarizing plate etc., and the polarizing division may also be made by use of a polarizing beam splitter as a substitute for the dichroic mirror DM.

Moreover, in the first through fourth examples described above, the discussion on the element for guiding the beam for the optical tweezers and the illumination beam for observation has been made as a case of using mainly the lens, the plane-parallel plate, the dichroic mirror and the diffraction optical element. In fact, however, the guiding element is not limited to these optical elements. For instance, the beam for the optical tweezers and the illumination beam for the observation may also be guided by using, e.g., an optical fiber, and the minute particle S may be irradiated or illumination with the beam. In this case, it is expected that this contrivance contributes to downsize the minute particle optical manipulation apparatus.

Further, when the minute particle S is irradiated with the optical tweezers oriented beam guided by the optical fiber, if using the optical fiber that itself incorporates a function of generating the predetermined plus spherical aberration SA, there is eliminated the necessity of separately providing the converging optical system O for giving the plus spherical aberration SA. It is therefore expected the minute particle optical manipulation apparatus is further downsized.

Moreover, in the first through the fourth examples described above, the observation optical system has been illustrated so that the enlarged image of the minute particle S which is formed on the image surface IMG is observed from above. As a substitute for this method, however, there may be adopted a method of observing the image from under as in the case of, e.g., an inverted microscope.

Further, in the first and second examples explained above, the minute particle S in the medium B held by the holder H is irradiated from above with the beam for the optical tweezers. In the third example, as the minute particle S in the medium B held by the holder H is irradiated from under with the beam for the optical tweezers, the direction in which the beam for the optical tweezers enters the medium B where the minute particle S exists may be either an upward direction or a downward direction. Then, this is the same with respect to the observation optical system. The incident directions of the beam for the optical tweezers and of the illumination beam for the observation and a combination thereof may be freely set three-dimensionally within the range of the concept of the present invention.

Moreover, as the method of giving the predetermined plus spherical aberration SA to the cone-shaped converged beam with which the minute particle S in the medium B is irradiated, in addition to what has been exemplified in the first to third examples, for example, there are methods of replacing, if a cover glass is placed on the surface of the medium B where the minute particle S exists, this cover glass with one exhibiting a high refractive index, and replacing, if using an oil-immersed objective lens as a converging optical system this oil with one exhibiting a high refractive index.

As discussed above in depth, the minute particle optical manipulation method and apparatus exhibit the following effects.

Namely, the minute particle optical manipulation method according to the first aspect of the present invention is capable of strengthening the trapping force acting in the optical-axis direction without inserting a special prism and making a high-level adjustment and of expanding a range of the trapping force acting in the optical-axis direction by irradiating the minute particle in the medium with the cone-shaped converged beam having the plus spherical aberration and thus trapping and manipulating the minute particle. This minute particle optical manipulation method is further capable of obtaining a sufficiently strong trapping force in the deep position in the medium while keeping the trapping force when the minute particle exists in a shallow position in the medium.

Moreover, the minute particle optical manipulation method according to the second aspect of the present invention is capable of selecting the optimum plus spherical aberration even when conditions of the target minute particle itself and conditions under which the particle exists are different by arbitrarily changing the plus spherical aberration of the cone-shaped converged beam with which the minute particle is irradiated in accordance with the conditions of the minute particle in the medium. Hence, the minute particle optical manipulation method according to the first aspect of the present invention exhibits effects of strengthening the trapping force in the optical-axis direction, expanding the range in which the trapping force acts in the optical-axis direction and obtaining the sufficiently strong trapping force even in the deep position in the medium while keeping the trapping force when the minute particle is in the shallow position in the medium, corresponding to a variety of changes in the conditions of the minute particle in the medium.

Further, in the minute particle optical manipulation method according to the first or second aspect of the present invention, there is established a relationship such as:

$$n1>n2$$

where n1 is a refractive index of the minute particle, and n2 is a refractive index of the medium. It is preferable that the spherical aberration SA with respect to the maximum NA component of the cone-shaped converged beam has the following relationship:

$$0.2\ R \leqq SA \leqq 1.5\ R$$

where R is a radius of the minute particle. In this case, the effects yielded by the minute particle optical manipulation method according to the first or second aspect of the present invention can be exhibited most effectively.

Moreover, the minute particle optical manipulation apparatus according to the third aspect of the present invention includes the converging optical system for generating the cone-shaped converged beam having the plus spherical aberration, and is therefore capable of easily carrying out the minute particle optical manipulation method according to the first aspect, by which the minute particle in the medium is irradiated with the cone-shaped converged beam having the plus spherical aberration, then trapped and manipulated. Hence, the minute particle optical manipulation apparatus is capable of exhibiting the effects yielded by the minute particle optical manipulation method according to the first aspect such as strengthening the trapping force in the optical-axis direction, expanding the range in which the trapping force acts in the optical-axis direction and obtaining the sufficiently strong trapping force even in the deep position in the medium while keeping the trapping force when the minute particle is in the shallow position in the medium.

Moreover, the minute particle optical manipulation apparatus according to the fourth aspect of the present invention includes the spherical aberration changing device for arbitrarily changing the plus spherical aberration of the cone-shaped converged beam generated by the converging optical system, and is therefore capable of easily carrying out the minute particle optical manipulation method according to the second aspect, by which the plus spherical aberration of the cone-shaped converged beam is arbitrarily changed in accordance with the conditions of the minute particle in the medium. Hence, the minute particle optical manipulation apparatus is capable of exhibiting the effects yielded by the minute particle optical manipulation method according to the second aspect such as strengthening the trapping force in the optical-axis direction, expanding the range in which the trapping force acts in the optical-axis direction and obtaining the sufficiently strong trapping force even in the deep position in the medium while keeping the trapping force when the minute particle is in the shallow position in the medium, corresponding to a variety of changes in the conditions of the minute particle in the medium.

Further, in the minute particle optical manipulation apparatus according to the fifth aspect of the present invention, the observation optical system containing a part of the whole of the converging optical system is provided with the correction mechanism for correcting the plus spherical aberration of the converging optical system or the in-focus position of the observation optical system. Therefore, the observation optical system shares a part or the whole of the converging optical system for generating the cone-shaped converged beam having the plus spherical aberration. Even if the spherical aberration and a defocus occur in the observation optical system due to the above configuration, the correction mechanism is capable of correcting the spherical aberration and the defocus, and it is therefore possible to prevent an occurrence of such a situation that an observed image of the minute particle is viewed in blur when observing the minute particle through the observation optical system with the result that only a low contrast is obtained.

Furthermore, in the minute particle optical manipulation apparatus according to the sixth aspect of the present invention, the observation optical system is provided independently of the converging optical system, and hence it is feasible to avoid the spherical aberration and the defocus from occurring in the observation optical system because of sharing a part or the whole of the converging optical system for generating the cone-shaped converged beam having the plus spherical aberration. It is therefore possible to prevent an occurrence of such a situation that the observed image of the minute particle is viewed in blur when observing the minute particle through the observation optical system with the result that only the low contrast is obtained.

FIFTH EXAMPLE

Figure 13:
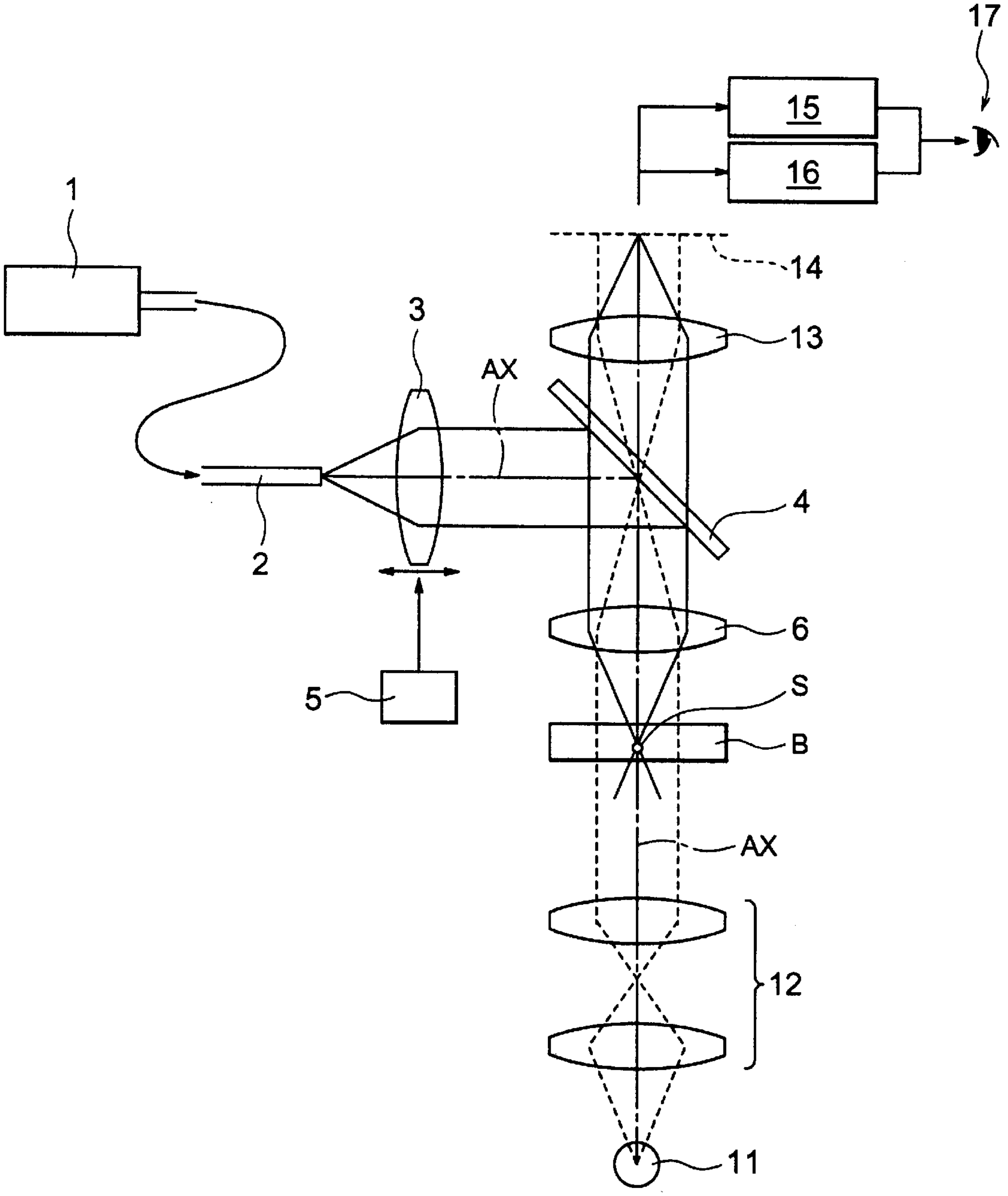
FIG. 13 is a view schematically showing the configuration of a minute particle optical apparatus according to another embodiment of the present invention.
Figure 14:
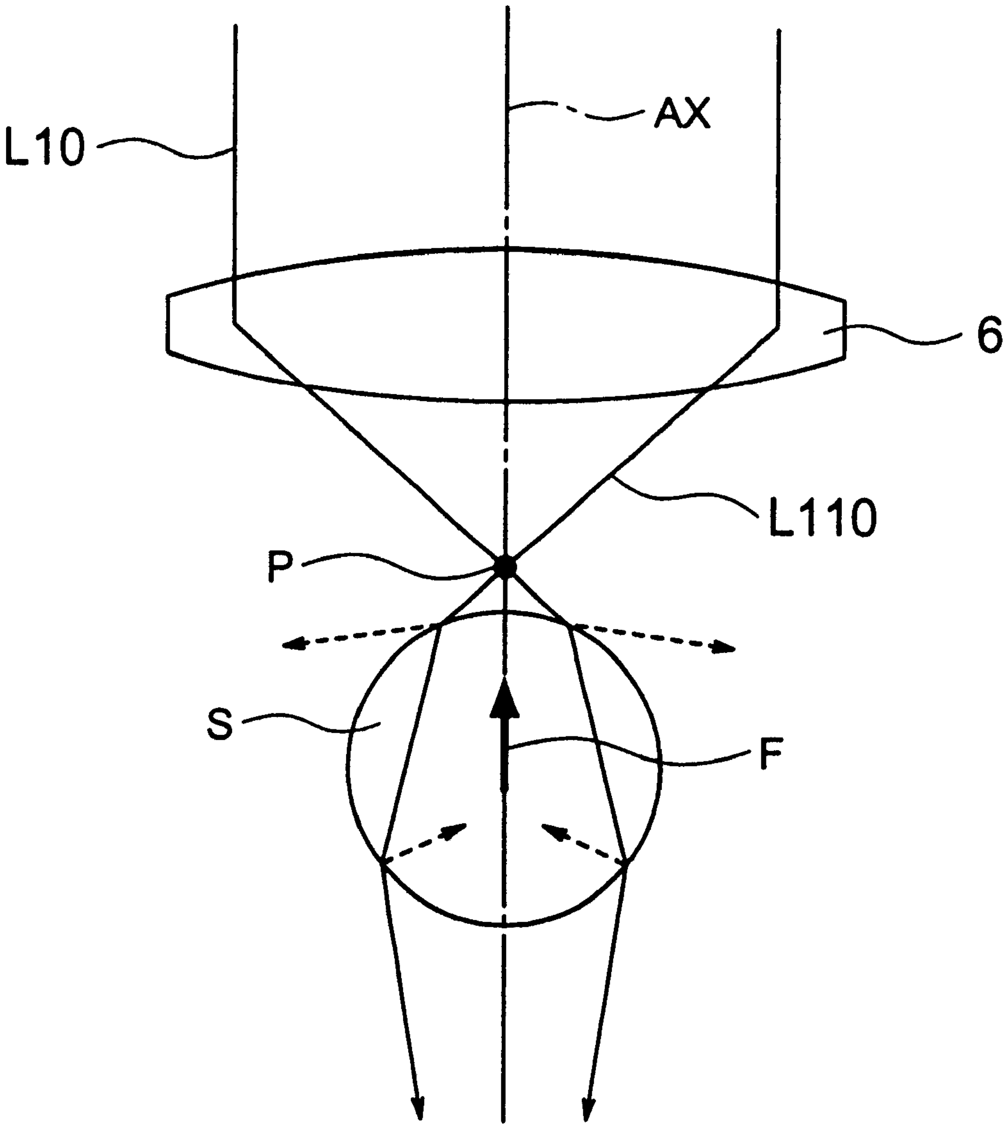
FIG. 14 is a view for explaining the principle of the minute particle optical apparatus in the another embodiment.

FIG. 13 is a view schematically showing the configuration of a minute particle optical manipulation apparatus according to second embodiment of the present invention, and FIG. 14 is a view for explaining the principle of the minute particle optical manipulation apparatus according to the this embodiment. The minute particle optical manipulation apparatus in this embodiment is provided with a light source 1 for supplying a so-called trapping light (tweezers light), as shown in FIG. 13. As the light source 1, a laser beam source for supplying infrared laser beam, for example, may be employed.

The light supplied from the light source 1 is incident on a light guide 2 such as an optical fiber, travels through such a light guide, and then is emitted from the exit end thereof. The light emitted from the exit end becomes approximately parallel light beam through a collector lens 3, so as to enter a dichroic mirror 4. In this case, the collector lens 3 is arranged to be movable along the optical axis AX by the action of a driving unit 5. In addition, the dichroic mirror 4 has a characteristic of wavelength-selectively reflecting light from the light source 1.

Accordingly, the trapping light from the light source 1 is reflected by the dichroic mirror 4, and then enters a converging optical system 6 with a spherical aberration satisfactorily corrected. As the converging optical system 6, an objective lens for a transmission type optical microscope, for example, may be employed. The trapping light converged through the converging optical system 6 is converged in the vicinity of the rear focal point thereof, so that a minute particle S in a medium B which is positioned in the vicinity of the convergent position thereof is irradiated with this trapping light. The medium B containing the minute particle S is held by a holder (not shown) such as a Petri dish or a slide glass.

The minute particle optical manipulation apparatus in this embodiment is also provided with another light source 11 for supplying a so-called observation light. As the observation light source 11, a halogen lamp for supplying visible light, for example, may be employed. An observation light (illumination light) from the observation light source 11 illuminates the minute particle S in the medium B through an illumination optical system 12. The light from the illuminated minute particle S becomes approximately parallel light beam through the converging optical system 6 serving as an objective lens, and then enters the dichroic mirror 4. In this case, the dichroic mirror 4 has a characteristic of wavelength—selectively transmit light emerged from the observation light source 11.

Accordingly, the light emerged from the minute particle S and illuminated by an observation light from the observation light source 11 forms, after transmitted through the dichroic mirror 4, an image of the minute particle S on a predetermined image plane 14 through a second objective lens 13. The image of the minute particle S formed on the image plane 14 is observed by a naked eye 17 through image pick-up means 15 such as a CCD camera or an eyepiece 16 which is positioned, for example, with respect to the image plane 14. In this manner, the observation light source 11, the illumination optical system 12, the converging optical system 6, the second objective lens 13, the image pick-up means 15 and/or eyepiece 16 constitute an observation system for observing the minute particle S on the basis of the observation light from the observation light source 11.

Here, referring to FIG. 14, the approximately parallel light beam L10 of the trapping light which is incident on the converging optical system 6 is converged through the converging optical system 6 on a point P on the optical axis AX thereof. In this manner, the converged beam which is generated through the converging optical system 6 (such as a cone-shaped or cone- and cylindrical-shaped converged beam) L110 is applied on the minute particle S existing in the vicinity of the converging point P. Note that in FIG. 14, for easy understanding of the principle of the minute particle optical manipulation apparatus according to this embodiment, the minute particle S is shown in a much larger size than the real one. The converged light beam L110 applied on the minute particle S is reflected by the surface of the minute particle S or refracted inside the minute particle S so as to deflect its traveling direction. As a result, a momentum of the converged light beam L110 changes so that a radiation pressure corresponding to the change in the momentum is generated and, as a result, a force F as indicated by the arrow in the bold solid line in FIG. 14 acts on the minute particle S.

In this case, it is known from analysis of the changes in the momentum of the converged beam L110 that, when the minute particle S has a larger refractive index than that of the surrounding medium (not shown in FIG. 14) B and is a non-absorptive spherical minute particle, the radiation pressure works on a portion having higher light intensity and there exerts such a trapping force as bringing the minute particle S closer toward the converging point P as the force F. Accordingly, in the minute particle optical manipulation apparatus in this embodiment, the minute particle S is trapped and manipulated by using this trapping force F. Also, for trapping and manipulating the minute particle S in the medium B, a condition of the minute particle S is observed using the observation optical system.

Figure 15:
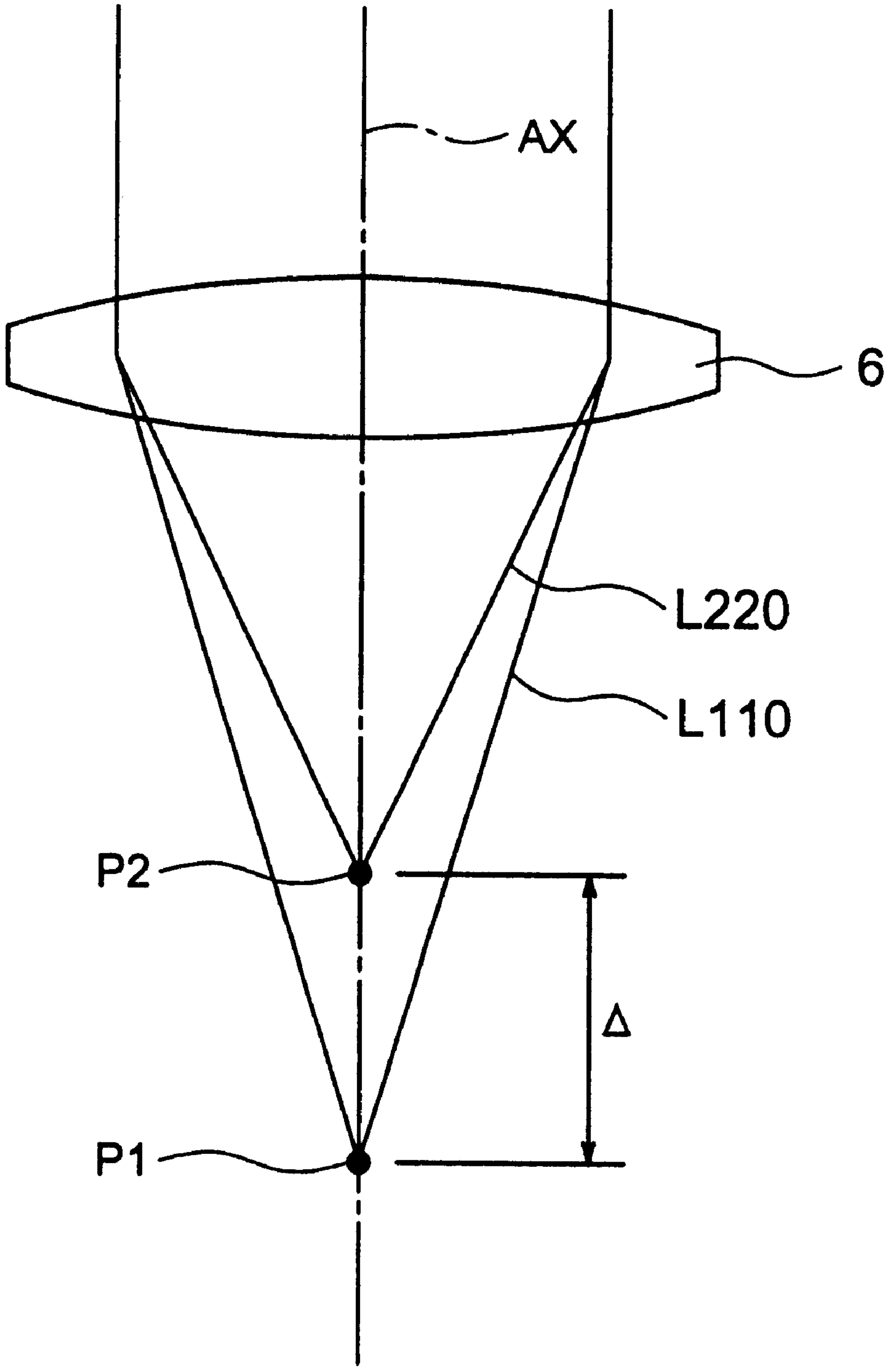
FIG. 15 is a view for explaining the axial chromatic aberration of a converging optical system in the minute particle optical apparatus in the another embodiment.

FIG. 15 is a view for explaining an axial chromatic aberration of the converging optical system in the minute particle optical manipulation apparatus according to this embodiment. Referring to FIG. 15, when the trapping light from the light source 1 enters the converging optical system 6 as a parallel light beam, the light L110 converged through the converging optical system 6 is converged on the point P1 on the optical axis AX. On the other hand, the observation light from the observation light source 11 actually enters the converging optical system 6 from below in the drawing. However, assuming that the observation light enters the converging optical system 6 as parallel light beam from above in the drawing, light L220 converged through the converging optical system 6 is converged on a point P2 on the optical axis AX. In this case, the converging point P2 is none other than the in-focus position with respect to the converging optical system 6 which serves as an objective lens in the observation system.

In this embodiment, as shown in FIG. 15, the converging point P1 is set at a position which is far separated from the converging optical system 6 only by a predetermined distance Δ along the optical axis AX than the converging point P2 of the converged beam L220 of the observation light, that is, the in-focus point P2 with respect to the converging optical system 6. In other words, the converging optical system 6 is arranged such that the axial chromatic aberration Δ of the observation light using the trapping light as a basis has a predetermined negative value and, more specifically, satisfies the above-described condition (1). Note that the converging point P1 of the converged beam L110 of the trapping force is substantially coincident with the position of the minute particle S which is trapped by the action of the converged beam L110, as described above.

Then, in this embodiment, it is arranged such that the position of the converging point P1 of the converged beam L110 of the trapping light is movable along the optical axis AX of the converging optical system 6. More specifically, in FIG. 13, when the collector lens 3 is moved from the standard state in which the exit end of the light guide 2 is coincident with the front focusing position of the collector lens 3 toward the dichroic mirror 4 along the optical axis AX by the action of the driving unit 5, a beam which is converged to some extent through the collector lens 3 is generated, and the thus converged beam enters in its turn the converging optical system 6. As a result, a plus spherical aberration is given to the converged beam L110 and the position of the converging point P1 thereof is moved to close to the converging optical system 6 along the optical axis AX.

On the other hand, when the collector lens 3 is moved toward the light guide 2 along the optical axis AX by the action of the driving unit 5 from the standard state, a diverged beam which is diverged to some extent through the collector lens 3 is generated and the thus diverged beam enters in its turn the converging optical system 6. As a result, a minus spherical aberration is given to the converged beam L110 and the position of the converging point P1 thereof is moved to be separated from the converging optical system 6 along the optical axis AX. In either case, an amount of movement of the converging point P1 along the optical axis AX depends on an amount of movement of the collector lens 3 along the optical axis AX.

In this embodiment, it is arranged such that the axial chromatic aberration Δ of the observation light using the trapping light as a basis in the converging optical system 6 has a predetermined negative value so that, in the standard state in which the exit end of the light guide 2 is coincident with the front focusing position of the collector lens 3, the position of the minute particle S which is trapped in the vicinity of the converging point P1 is substantially shifted from the in-focus position P2 with respect to the converging optical system 6 by the action of the converged beam L110. As a result, in this standard state, the position of the minute particle S trapped by the light is shifted from the in-focus position so that only an image of the minute particle out of focus with a reduced contrast can be observed.

Then, in this embodiment, in order to observe an excellent image of the minute particle with high contrast by making the position of the minute particle S trapped by the action of the converged beam L110 (and, in its turn, the position of the converging point P1 of the converged beam L110) substantially coincident with the in-focus position P2 with respect to the converging optical system 6, the converging point P1 of the converged beam L110 is moved to close to the converging optical system 6 along the optical axis AX by moving the collector lens 3 toward the dichroic mirror 4 along the optical axis AX by the action of the driving unit 5. In this case, as described above, upon movement of the convergent position P1 of the converged beam L110 toward the converging optical system 6, the plus spherical aberration is given to the converged beam L110.

Figure 16:
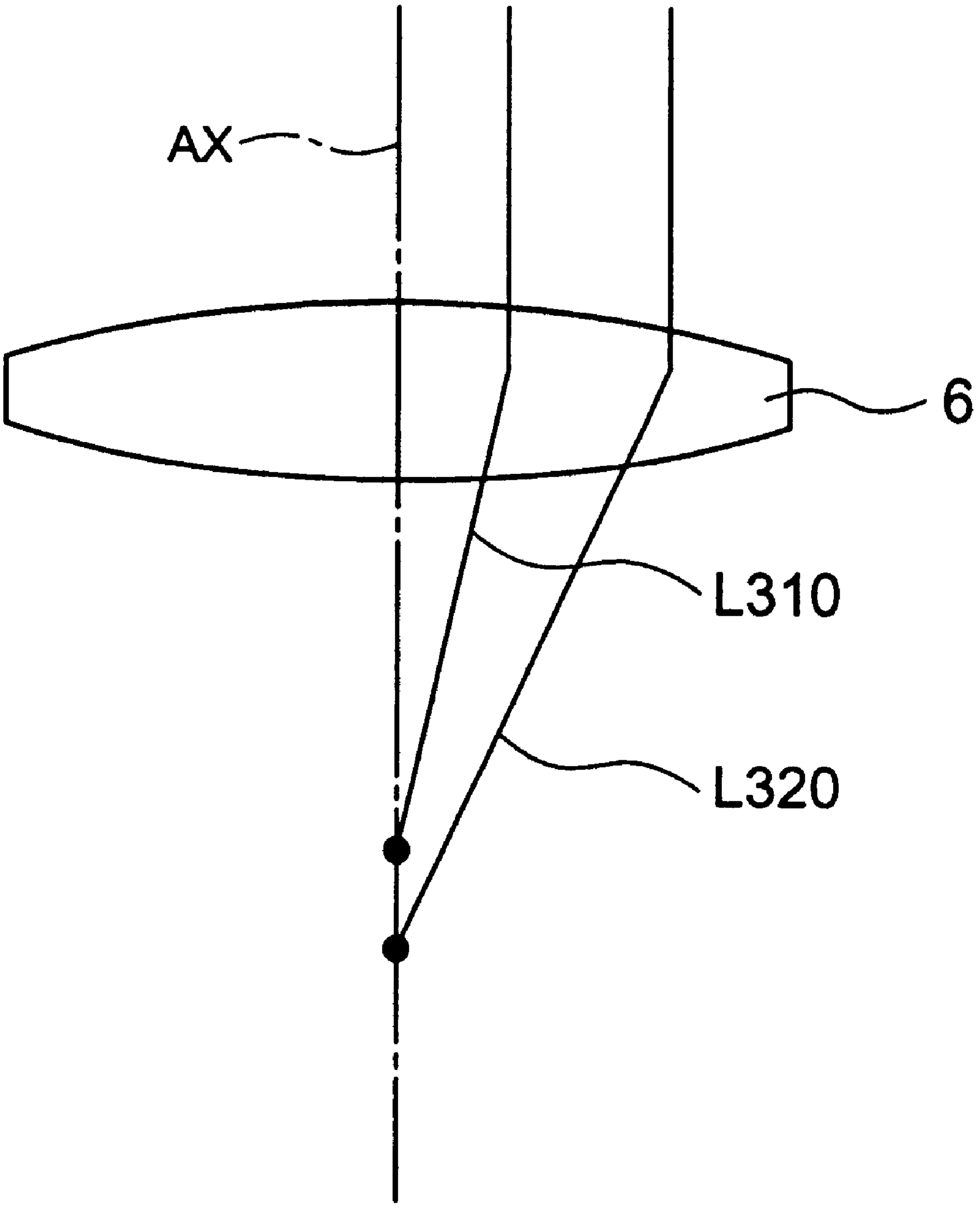
FIG. 16 is a view showing a state in which a plus spherical aberration is given to a converged beam of a trapping light.

Note that the state in which the plus spherical aberration is given to the converged beam L110 is, as shown in FIG. 16, a state in which a light beam L310 which has a comparatively small incident height crosses the optical axis AX at a position closer to the converging optical system 6 than a light beam L320 which has a comparatively large incident height. As a result, it is possible not only to stably maintain the trapping force strong by the action of the converged beam L110 with the plus spherical aberration applied thereon, but also to observe an excellent image of the minute particle with high contrast since the converging position P1 of the converged beam L110 (and, in its turn, the position of the minute particle S which is trapped by the action of the converged beam L110) is substantially coincident with the in-focus position.

Note that in the foregoing second embodiment, the converging point P1 of the converged beam L110 is moved along the optical axis AX by moving the collector lens 3 along the optical axis AX. However, the arrangement for moving the converging point P1 of the converged beam L110 along the optical axis AX is not limited to this, but a number of variations can be considered within the spirit of the present invention. For example, it is possible to move the converging point P1 of the converged beam L110 along the optical axis by moving the exit end of the light guide 2 along the optical axis, or by moving both the exit end of the light guide 2 and the collector lens 3 along the optical axis AX.

It is also possible to move the converging point P1 of the converged beam L110 along the optical axis AX by disposing a plane-parallel plate or a diffraction optical element which is selected from a plurality of plane-parallel plates or diffraction optical elements having different characteristics on a light path between the exit end of the light guide 2 and the collector lens 3. In this case, the plurality of plane-parallel plates or diffraction optical elements are disposed, for example, on a turret (rotating plate) which rotates around the axis parallel to the optical axis AX along the circumference thereof so as to dispose a desirable plane-parallel plate or diffraction optical element on the light path by rotating the turret. It is obvious that the arrangement is not limited to the above turret scheme. It is possible to utilize, for example, the known slide scheme.

As described above, in the minute particle optical manipulation apparatus according to the second embodiment of the present invention, since it is arranged that the axial chromatic aberration Δ of the observation light which uses the trapping light in the converging optical system as a basis has a predetermined negative value, the position of a converged beam which is generated when parallel light beam of the trapping light is incident on the converging optical system is farther from the converging optical system by a predetermined distance along the optical axis than the in-focus position with respect to the converging optical system.

Accordingly, when the converging position of the converged beam is moved toward the converging optical system along the optical axis in order to observe an excellent image of the minute particle with high contrast by making the position of the minute particle trapped by the action of the converged beam (and the converging position of the converged beam, in its turn) to be substantially coincident with the in-focus position, the plus spherical aberration is given to the converged beam. As a result, according to the present invention, it is possible to stably maintain the strong trapping force by the action of the converged beam with the plus spherical aberration given thereto and also to observe an excellent image of the minute particle with high contrast since the converging position of the converged beam (that is, the position of the minute particle which is trapped by the action of the converged beam) is substantially coincident with the in-focus position.

What is claimed is:

1. A minute particle optical manipulation method comprising:

a step of irradiating a minute particle in a medium with a cone-shaped converged beam having a plus spherical aberration; and a step of trapping and manipulating the minute particle.

2. A minute particle optical manipulation method according to claim 1, further comprising a step of arbitrarily changing the plus spherical aberration of the cone-shaped converged beam in accordance with a condition of the minute particle in the medium.

3. A minute particle optical manipulation method according to claim 1 or 2, wherein there is established a relationship such as:

$$n1>n2$$

where n1 is a refractive index of the minute particle, and n2 is a refractive index of the medium, and a spherical aberration SA with respect to a maximum NA component of the cone-shaped converged beam has the following relationship:

$$0.2\,R \leqq SA \leqq 1.5\,R$$

where R is a radius of the minute particle.

4. A minute particle optical manipulation apparatus comprising:

a converging optical system for generating a cone-shaped converged beam having a plus spherical aberration, wherein a minute particle in a medium is irradiated with the cone-shaped converged beam having the plus spherical aberration that emerges from said converging optical system, and is trapped and manipulated.

5. A minute particle optical manipulation apparatus according to claim 4, further comprising spherical aberration changing means for arbitrarily changing the plus spherical aberration of the cone-shaped converged beam which is generated by said converging optical system in accordance with a condition of the minute particle in the medium.

6. A minute particle optical manipulation apparatus according to claim 4 or 5, further comprising an observation optical system, including a part or the whole of said converging optical system, for observing the minute particle, wherein said observation optical system is provided with correcting means for correcting the plus spherical aberration of said converging optical system or an in-focus position of said observation optical system.

7. A minute particle optical manipulation apparatus according to claim 4 or 5, wherein said observation optical system for observing the minute particle is provided independently of said converging optical system.

8. A minute particle optical manipulation apparatus for irradiating a minute particle in a medium with a converged beam generated through a converging optical system on the basis of a trapping light so as to optically trap and manipulate said minute particle, comprising:

an observation system for observing said minute particle through said converging optical system on the basis of an observation light having a substantially different wavelength from that of said trapping light, wherein an axial chromatic aberration Δ of said observation light which uses said trapping light as a basis in said converging optical system has a predetermined negative value.

9. A minute particle optical manipulation apparatus according to claim 8, wherein said axial chromatic aberration Δ satisfied the following relationship:

$$-10 \leqq \Delta/\varnothing \leqq -0.12,$$

where Ø is the size of said minute particle.

10. A minute particle optical manipulation apparatus according to claim 8 or 9, further comprising:

moving means for moving the converging position of the converged beam generated through said converging optical system on the basis of said trapping light along the optical axis of said converging optical system.

11. A microscope objective lens which is used as said converging optical system in the minute particle optical manipulation apparatus according to claim 8, wherein said axial chromatic aberration Δ satisfied the following relationship:

$$-10 \leqq \Delta/\varnothing \leqq -0.12,$$

where Ø is the size of said minute particle.

* * * * *